US012631206B2

(12) United States Patent
Toll et al.

(10) Patent No.: US 12,631,206 B2
(45) Date of Patent: May 19, 2026

(54) TWIST-LOCK FIXINGS

(71) Applicant: HellermannTyton Corporation, Milwaukee, WI (US)

(72) Inventors: Michael Toll, Whitefish Bay, WI (US); Cabren Spangler, Menomonee Falls, WI (US); Justin Gallion, Milwaukee, WI (US); Alexander Mann, Port Washington, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 6 days.

(21) Appl. No.: 18/647,806

(22) Filed: Apr. 26, 2024

(65) Prior Publication Data

US 2025/0129813 A1     Apr. 24, 2025

Related U.S. Application Data

(60) Provisional application No. 63/591,911, filed on Oct. 20, 2023.

(51) Int. Cl.
F16B 21/02      (2006.01)

(52) U.S. Cl.
CPC .................................. F16B 21/02 (2013.01)

(58) Field of Classification Search
CPC .... F16B 21/02; F16B 5/10; F16B 1/02; F16B 2200/10
See application file for complete search history.

(56) References Cited

U.S. PATENT DOCUMENTS

| | | |
|---|---|---|
| 1,711,730 A | 5/1929 | Gibson |
| 3,632,069 A | 1/1972 | Thayer et al. |
| 3,632,071 A | 1/1972 | Cameron et al. |
| 4,009,509 A | 3/1977 | Mccormick |
| 4,032,096 A | 6/1977 | Perrault et al. |
| 4,185,800 A | 1/1980 | Kabel |
| 4,269,379 A | 5/1981 | Mccormick |
| 4,607,414 A | 8/1986 | Six |

(Continued)

FOREIGN PATENT DOCUMENTS

| | | |
|---|---|---|
| CN | 101678933 A | 3/2010 |
| CN | 217355883 U | 9/2022 |

(Continued)

OTHER PUBLICATIONS

"Extended European Search Report", EP Application No. 24172843. 5, Oct. 14, 2024, 9 pages.

(Continued)

*Primary Examiner* — David M Upchurch
(74) *Attorney, Agent, or Firm* — Colby Nipper PLLC

(57)      ABSTRACT

A twist-lock fixing may include a connector configured for receipt into a locking channel. The connector includes a stem having a first end opposite a second end. The stem includes a locking tab extending from a first side of the stem. The connector includes a head, the head extending from the second end of the stem and spaced apart from the locking tab. The twist-lock fixing may include a body section attaching to the connector at the first end of the stem. The body section includes a flange configured for contacting a first side of the workpiece to limit a longitudinal insertion of the connector into the locking channel.

20 Claims, 9 Drawing Sheets

(56) References Cited

U.S. PATENT DOCUMENTS

| | | | |
|---|---|---|---|
| 4,652,192 | A | 3/1987 | Schaller |
| 4,705,442 | A | 11/1987 | Fucci |
| 5,216,206 | A | 6/1993 | Maesako |
| 5,332,179 | A | 7/1994 | Kuffel et al. |
| 5,368,261 | A | 11/1994 | Caveney et al. |
| 5,772,258 | A | 6/1998 | Dyer et al. |
| 5,820,083 | A | 10/1998 | Geiger |
| 5,832,567 | A | 11/1998 | Edwards et al. |
| 5,896,720 | A | 4/1999 | Bond |
| 5,937,488 | A | 8/1999 | Geiger |
| 5,961,081 | A | 10/1999 | Rinderer |
| 5,966,781 | A | 10/1999 | Geiger |
| 6,003,208 | A | 12/1999 | Christian et al. |
| D424,922 | S | 5/2000 | Sherman et al. |
| 6,240,602 | B1 | 6/2001 | Geiger |
| 6,533,226 | B2 | 3/2003 | Geiger |
| 6,669,149 | B2 | 12/2003 | Akizuki |
| 6,923,407 | B2 | 8/2005 | Takeuchi |
| 6,991,102 | B2 | 1/2006 | Kurmis |
| D543,835 | S | 6/2007 | Geiger |
| 7,240,880 | B2 | 7/2007 | Benoit et al. |
| 7,278,188 | B2 | 10/2007 | Kurmis |
| 7,437,804 | B1 | 10/2008 | Geiger et al. |
| 7,503,528 | B2 | 3/2009 | Adams et al. |
| 7,520,476 | B2 | 4/2009 | Caveney et al. |
| 7,600,724 | B2 | 10/2009 | Nelson et al. |
| 7,621,487 | B2 | 11/2009 | Brown et al. |
| 7,621,488 | B2 | 11/2009 | Miller |
| 7,661,632 | B2 | 2/2010 | Caveney et al. |
| 7,753,320 | B2 | 7/2010 | Geiger et al. |
| 7,780,122 | B1 | 8/2010 | Herbers |
| D631,739 | S | 2/2011 | Craig et al. |
| 8,028,962 | B2 | 10/2011 | Geiger |
| 8,177,173 | B2 | 5/2012 | Spiess |
| 8,281,461 | B2 | 10/2012 | Geiger |
| 8,313,064 | B2 | 11/2012 | Stocker |
| 8,601,649 | B2 | 12/2013 | Klein et al. |
| 8,894,022 | B2 | 11/2014 | Chirpich et al. |
| 8,991,774 | B2 | 3/2015 | Hajduch |
| D734,654 | S | 7/2015 | Geiger et al. |
| 9,212,677 | B2 * | 12/2015 | Owen ................. F16B 13/0808 |
| D760,067 | S | 6/2016 | Geiger |
| 9,633,763 | B2 | 4/2017 | Murao et al. |
| 9,899,822 | B2 | 2/2018 | Richardson et al. |
| 10,082,224 | B2 | 9/2018 | Otterstrom |
| 10,186,851 | B2 | 1/2019 | Peterson et al. |
| D844,416 | S | 4/2019 | Dyer |
| 10,428,976 | B2 | 10/2019 | Matz |
| 10,920,910 | B1 | 2/2021 | Gretz |
| 11,142,381 | B1 | 10/2021 | Geiger et al. |
| 11,505,378 | B2 | 11/2022 | Geiger et al. |
| 11,677,222 | B1 | 6/2023 | Sylvester et al. |
| 11,738,922 | B2 | 8/2023 | Geiger et al. |
| 11,753,091 | B2 * | 9/2023 | Criado Del Pino .. F16B 37/042 224/42.12 |
| 12,460,749 | B2 | 11/2025 | Geiger |
| 2002/0071715 | A1 | 6/2002 | Geiger |
| 2002/0084388 | A1 | 7/2002 | Geiger |
| 2003/0222184 | A1 | 12/2003 | Geiger |
| 2004/0076465 | A1 | 4/2004 | Geiger |
| 2004/0113024 | A1 | 6/2004 | Caveney et al. |
| 2005/0242247 | A1 | 11/2005 | Geiger |
| 2007/0102594 | A1 | 5/2007 | Geiger et al. |
| 2007/0138350 | A1 | 6/2007 | Brown et al. |
| 2007/0257159 | A1 | 11/2007 | Nelson et al. |
| 2007/0290100 | A1 | 12/2007 | Caveney |
| 2008/0078890 | A1 | 4/2008 | Nelson et al. |
| 2010/0096511 | A1 | 4/2010 | Olver |
| 2011/0068234 | A1 | 3/2011 | Schaety et al. |
| 2012/0074278 | A1 * | 3/2012 | Hamaguchi ............. F16B 21/02 248/221.11 |
| 2012/0217355 | A1 | 8/2012 | Geiger et al. |
| 2013/0119208 | A1 | 5/2013 | Geiger |
| 2013/0175410 | A1 | 7/2013 | Caveney |
| 2016/0047494 | A1 | 2/2016 | Dickinson et al. |
| 2016/0223100 | A1 | 8/2016 | Geiger |
| 2017/0122459 | A1 | 5/2017 | Haynes et al. |
| 2018/0231044 | A1 | 8/2018 | Bejin et al. |
| 2019/0036314 | A1 | 1/2019 | Toll et al. |
| 2020/0102979 | A1 | 4/2020 | Bejin et al. |
| 2020/0132101 | A1 * | 4/2020 | Zander ..................... F16B 5/10 |
| 2022/0033154 | A1 | 2/2022 | Geiger et al. |
| 2024/0360856 | A1 | 10/2024 | Klos et al. |
| 2024/0360922 | A1 | 10/2024 | Klos et al. |
| 2024/0360923 | A1 | 10/2024 | Geiger |

FOREIGN PATENT DOCUMENTS

| | | |
|---|---|---|
| DE | 102014003582 | 9/2015 |
| DE | 202016000926 U1 | 7/2016 |
| EP | 1868272 | 12/2007 |
| EP | 1960677 B1 | 8/2009 |
| EP | 2162961 B1 | 3/2012 |
| EP | 3462042 B1 | 5/2022 |
| WO | 2007133966 | 11/2007 |

OTHER PUBLICATIONS

"1-Piece Cable Tie/Arrowhead Mount with Wings—126-00042", Retrieved at: https://www.hellermanntyton.us/products/126-00042/— on Apr. 25, 2023, 6 pages.

"2-Piece Cable Tie & Edge Clip—156-00537", Retrieved at: https://www.hellermanntyton.us/products/156-00537/—on Apr. 25, 2023, 5 pages.

"2-Piece Cable Tie & Edge Clip—156-00541", Retrieved at: https://www.hellermanntyton.us/products/156-00541/—on Apr. 25, 2023, 5 pages.

"2-Way Saddle Mount—S2HM250HIRHSH1", Retrieved at: https://www.hellermanntyton.us/products/151-29403/—on Apr. 25, 2023, 5 pages.

"Cable Tie Anchor Mount—Part No. CTAM110C2", Retrieved at: https://www.hellermanntyton.us/products/151-31103/—on Apr. 25, 2023, 4 pages.

"Dual Swivel Saddle Spacer for T50-T250—DSWS50HSH1", Retrieved at: https://www.hellermanntyton.us/products/151-06501/— on Apr. 25, 2023, 4 pages.

"Extended European Search Report", EP Application No. 24172819. 5, Sep. 13, 2024, 10 pages.

"High Torque Mount—151-02094", Retrieved at: https://www. hellermanntyton.us/products/151-02094/—on Apr. 25, 2023, 5 pages.

"Rubber Adhesive Cable Tie Mount—MB3A10C2", Retrieved at: https://www.hellermanntyton.us/products/151-28718/—on Apr. 25, 2023, 4 pages.

"Aluminium Frame Rail Mount—AFLM30-1", HellermannTyton, Mar. 2, 2016, 1 page.

"Aluminium Frame Rail Mount—AFLM40-1", Hellermann Tyton, Apr. 1, 2016, 1 page.

"Av-QualGear CM1-B-100-P Cable Tie Mount, Black", Retrieved at: https://www.qualgear.com/products/av/165/qualgear-cm1-b-100-p-cable-tie-mount-black—on Feb. 14, 2024, 7 pages.

"Cradle MB", https://www.hellermanntyton.com/shared/datasheets/CAD_141281.pdf, Apr. 10, 2023, 1 page.

"CT QM5", https://www.hellermanntyton.com/shared/datasheets/CAD_10-0635-001-csg.pdf, Mar. 25, 2011, 1 page.

"CTAM1-PEEK", https://www.hellermanntyton.com/shared/datasheets/CAD_12-0048-001-csg.pdf, Jan. 31, 2012, 1 page.

"CTM Series Cable Tie Mount", Retrieved at: https://www.hellermanntyton.com/shared/datasheets/CAD_16-1331-010_CSU.pdf—on Nov. 17, 2023, 1 page.

"CTM Series Cable Tie Mount", Drawing No. 11-0318-001-DTL, Jun. 18, 2021, 1 page.

"Extended European Search Report", EP Application No. 21178722. 1, Nov. 15, 2021, 6 pages.

"Foreign Office Action", CN Application No. 202110830429.3, Jan. 31, 2024, 17 pages.

"Foreign Office Action", CN Application No. 202110830429.3, Jun. 1, 2023, 19 pages.

(56) References Cited

OTHER PUBLICATIONS

"Foreign Office Action", CN Application No. 202110830429.3, Oct. 27, 2023, 17 pages.
"FTH-27-12-01 Essentra Compontents", Retrieved at: https://www.digikiey.com/en/products/detail/essentra-components/FTH-27-12-01/391736—on Feb. 14, 2024, 4 pages.
"J-Pro Cable Support Sstem—Let Panduit Support Your Cables", Retrieved at; https://www.panduit.com/content/dam/panduit/en/products/media/7/17/117/1117/98451117.pdf—on Apr. 8, 2024, 6 pages.
"Magnetic Clip, 1 in. bundle diam., Large, 15 lbf pull rate", https://assets.hellermanntyton.us/m/ea259b2011e4157d/original/23-0068-001-CSU-pdf.pdf—Drawing No. 23-0068-001-CSU, Apr. 20, 2023, 1 page.
"Magnetic J-Hook, 2 in. diam. hook, Side Mount, 90 lbf pull rate", https://assets.hellermanntyton.us/m/c1c46e98190880c0/original/23-0075-001-CSU-pdf.pdf—Drawing No. 23-0075-001-CSU, Apr. 20, 2023, 1 page.
"Metal Content Aluminium Frame Rail Mount—MCAFLM30-1-BLU", HellermanTytan, May 18, 2018, 1 page.
"Metal Content Aluminium Frame Rail Mount—MCAFLM40-1-BLU", Jan. 31, 2019, 1 page.
"Notice of Allowance", U.S. Appl. No. 16/940,262, filed Jun. 11, 2021, 7 pages.
"Notice of Allowance", U.S. Appl. No. 17/483,198, Aug. 24, 2022, 7 pages.
"NSi Industries 0.120 in. Hole Saddle Tie Mount,", Retrieved at: https://www.homedepot.com/p/NSi-Industries-0-120-in-Hole-Saddle-Tie-Mount-Black-100-Pack-SM-1-B/307271139—on Feb. 14, 2024, 8 pages.
"Panduit ABMT-S6-Q60: Amazon.com: Industrial & Scientific", Retrieved at: https://www.amazon.com/Panduit-ABMT-S6-Q60/dp/B00HW8R6B4—on Feb. 14, 2024, 10 pages.

"Phoenix Contact—3240703—Black Nylon Fixing Cable Tie; 15mm×9.5; WT-Base HF 5 Wire Tie Series—RS", Retrieved at: https://us.rs.online.com/product/phoenix-contact/3240703/702353254/—on Feb. 14, 2024, 10 pages.
"Snapklik.com : Helonge Cable Tie Mounting, 100 Pcs Zip Tie Base, 5 Mm", Retrieved at: https://snapklik.com/en-aw/product/helonge-cable-tie-mounting-100-pcs-zip-tie-base-5-mm-m5-screw-hole-23x16x9-lwh-mm-cord-tie-mount-wire-tie-holder-fix-bottom-wire-management-for-home-office-outdoor-garden/08ZU4P27YA365—on Feb. 14, 2024, 7 pages.
"T5OR Standard Cable Tie with EC4 Mount", https://assets.hellermanntyton.us/m/498a2a1c9ba3f6bf/original/CT2050058CST.pdf, Jun. 29, 2009, 1 page.
"Notice of Allowance", U.S. Appl. No. 18/648,072, filed Jul. 1, 2025, 7 pages.
"Restriction Requirement", U.S. Appl. No. 18/647,914, filed May 21, 2025, 6 pages.
"Non-Final Office Action", U.S. Appl. No. 18/647,914, filed Aug. 27, 2025, 13 pages.
"Final Office Action", U.S. Appl. No. 18/647,914, filed Dec. 4, 2025, 11 pages.
"Non-Final Office Action", U.S. Appl. No. 18/647,992, filed Jan. 16, 2026, 15 pages.
"Advisory Action", U.S. Appl. No. 18/647,914, filed Jan. 28, 2026, 3 pages.
"Foreign Office Action", EP Application No. 24172833.6, Feb. 26, 2026, 7 pages.
"Foreign Office Action", EP Application No. 24172833.6, Feb. 26, 2026, 8 pages.
"Non-Final Office Action", U.S. Appl. No. 18/647,914, filed Apr. 8, 2026, 11 pages.

* cited by examiner

100

TWIST-LOCK FIXING
102

BODY SECTION
110

RECESS
112

MOUNTING SECTION
120

CONNECTOR
122

LOCKING TAB
124

OBJECT SUPPORT
130

WORKPIECE
170

MOUNTING APERTURE
172

COMPONENT
150

TWIST-LOCK FIXINGS

INCORPORATION BY REFERENCE

This application claims the benefit of U.S. Provisional Application No. 63/591,911, filed Oct. 20, 2023, the disclosure of which is incorporated herein by reference.

BACKGROUND

A fixing is used to attach one or more components (e.g., elongated articles, a bundle of elongated articles) to a workpiece (e.g., a support beam, a housing). A fixing may include a mounting section configured to attach the component to the workpiece through: a mounting aperture (e.g., a slot, a channel, a bore) defined in the workpiece; an elongated fastener extending from the workpiece (e.g., a stud, a threaded bolt); clamping onto an edge of the workpiece; and the like.

A fixing may include an object support that is configured to attach to the component. Examples of object supports include, but are not limited to, clamps, clips, mounts, and the like. For example, a fixing may include a cradle mount object support that includes a cradle portion that is configured for receiving, securing, and/or supporting one or more components. An object support may include one or more cable ties used to bundle the component and/or to hold a bundle of one or more components to the object support.

Fixings are frequently used in machinery installations to locate a component in a fixed position relative to other components and/or equipment. For example, a user (e.g., installer, operator) can use a fixing to attach a component to a machinery frame at a desired location.

A modular rail mounting system (e.g., an aluminum T-slotted framing system) is one example of a workpiece. A modular rail mounting system includes a support beam (e.g., aluminum extrusion, plastic extrusion, extruded channel rail) having a pair of spaced apart side rails that define a channel (e.g., an open-topped channel) therebetween. The channel may be a longitudinally extending T-shaped slot (e.g., "T-slot") that is defined in the support beam. In other aspects, the channel may be an aperture (e.g., oval-shaped hole, slot-shaped hole) or the like that is defined in the workpiece.

A fixing for a modular rail mounting system includes a mounting section that is configured for mounting the fixing to the workpiece. The mounting section may include a connector (e.g., a fastener, a fastening device). The connector may be a twist-lock connector that utilizes a "twist-and-lock" mechanism. A twist-and-lock mechanism is a releasable connector that is configured for positioning within a T-slot and locking by rotation therein. For example, the twist-lock connector can be positioned within the T-slot, and, once positioned at a desired location along the length of the T-shaped slot, the twist-lock connector can be rotated (e.g., a quarter turn, ninety degrees (90°)) relative to the T-slot to cause a twist-lock mechanism to engage the support beam and lock the connector into place within the T-slot. In one example, the twist-lock connector has a slight taper that enables a spring-lock engagement between the twist-lock connector, and the side rails lock the fixing in position on the T-slot.

Existing modular rail mounting systems with twist-lock connectors can be prone to wobbling and/or migration from an initial placement along the T-slot to another position due to vibration. To address such wobbling and/or migration issues, the user may need to replace a worn twist-lock connector, add shims, and/or regularly check the mount location of the twist-lock connector on the modular rail mounting system and reposition it, as needed. In the end, taking such remedial actions can cost both time and labor.

SUMMARY

This document describes twist-lock fixings. In some aspects, the techniques described herein relate to a twist-lock fixing configured for attaching to a workpiece at a locking channel defined in the workpiece, the twist-lock fixing including: a connector configured for receipt into the locking channel, the connector including: a stem having a first end opposite a second end, the stem including: a locking tab extending from a first side of the stem; and a head, the head extending from the second end of the stem, the head spaced apart from the locking tab; and a body section, the body section attaching to the connector at the first end of the stem, the body section including: a flange configured for contacting a first side of the workpiece to limit a longitudinal insertion of the connector into the locking channel.

In some aspects, the techniques described herein relate to a twist-lock fixing configured for attaching to a workpiece at a locking channel defined in the workpiece, the twist-lock fixing including: a connector configured for receipt into the locking channel, the connector including: a stem having a first end opposite a second end, the stem including: a locking tab extending from a first side of the stem, the locking tab including a free end spaced apart from the stem; a first stop configured for limiting a rotation of the connector in the locking channel in a first direction, the first stop extending from a second side of the stem, the second side of the stem opposite the first side of the stem; and a second stop configured for limiting a rotation of the twist-lock fixing in the locking channel in the first direction, the second stop extending from the first side of the stem, the second stop spaced apart from the locking tab; and a head, the head extending from the second end of the stem, the head spaced apart from the locking tab; and a body section, the body section attaching to the connector at the first end of the stem, the body section including: a flange configured for contacting a first side of the workpiece to limit a longitudinal insertion of the connector into the locking channel, the flange including a lower side that faces the head, the lower side of the flange defining a recess configured to receive the free end of the locking tab, wherein as the twist-lock fixing is rotated from an unengaged position to a transitional position, the locking tab bends and the free end of the locking tab extends into the recess of the flange, wherein as the twist-lock fixing is further rotated from the transitional position to a locked position, the locking tab unbends and the free end of the locking tab unextends from the recess of the flange, and wherein in the locked position the locking tab is positioned to contact the locking channel to limit the rotation of the twist-lock fixing in the locking channel in a second direction that is opposite the first direction.

In some aspects, the techniques described herein relate to a twist-lock fixing configured for attaching to a workpiece at a locking channel defined in the workpiece, the twist-lock fixing including: a connector configured for receipt into the locking channel, the connector including: a stem having a first end opposite a second end, the stem including: a locking tab extending from a first side of the stem, the locking tab including a free end spaced apart from the stem; and a head, the head extending from the second end of the stem, the head spaced apart from the locking tab; a body section, the body section attaching to the connector at the first end of the stem, the body section including: a flange configured for contacting a first side of the workpiece to limit a longitudinal insertion of the connector into the locking channel, the flange including a lower side that faces the head, the lower side of the flange defining a recess configured to receive the free end of the locking tab; and an object support configured for supporting a component, the object support being a cradle mount defining a channel configured for receiving the component, the object support including: at least one receiver arm configured for retaining the component in the channel; and a stand-off member extending from the body section, the stand-off member configured for spacing the receiver arm apart from the body section to define the channel, wherein as the twist-lock fixing is rotated from an unengaged position to a transitional position, the locking tab bends and the free end of the locking tab extends into the recess of the flange, wherein as the twist-lock fixing is further rotated from the transitional position to a locked position, the locking tab unbends and the free end of the locking tab unextends from the recess of the flange, and wherein in the locked position the locking tab is positioned to contact the locking channel to limit the rotation of the twist-lock fixing in the locking channel in a second direction that is opposite the first direction.

This Summary is provided to introduce simplified concepts of twist-lock fixings that are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of twist-lock fixings are described with reference to the following Drawings, in which the use of the same numbers in different instances may indicate like features and/or components.

DETAILED DESCRIPTION

This document describes twist-lock fixings. In aspects, a twist-lock fixing is configured for attaching a component to a workpiece having a locking channel. The twist-lock fixing includes a connector that is configured for receipt into the locking channel (e.g., a T-slot channel). The twist-lock fixing also includes a body section that is configured for contacting a first side of the workpiece to limit a longitudinal insertion of the connector into the locking channel. The body section defines a recess that is configured to receive a portion of a locking tab of the connector. The locking tab includes a free end that is configured to extend (e.g., deflect) into the recess of the body section during the installation of the twist-lock fixing on the workpiece. After the installation of the twist-lock fixing on the workpiece is complete, the locking tab returns to a normal configuration and limits the rotation of the twist-lock fixing in the locking channel in a second direction that is opposite the first direction (e.g., a first rotational direction). In aspects, further rotation in the first direction is also limited.

In this way, the twist-lock fixing may have a twist-in force that is lower than a twist-out force, which results in a product that may be less likely to get inadvertently dislodged by others after the initial installation. By limiting the rotation of the twist-lock fixing in the locking channel in a second direction that is opposite the first direction, an installed twist-lock fixing may resist one or more of wobbling, migration along the locking channel from an original installed location, and/or sliding out of an original installed location. Further, by limiting the rotation of the twist-lock fixing in the locking channel in a second direction that is opposite the first direction, an installed twist-lock fixing may resist rotation out of the engaged position, providing for a more secure connection. Further, the described twist-lock fixings simplify component installation and rework. For example, when routing components using a described twist-lock fixing, the components stay in place, which allows for installation verification before the components are fixed into a bundle (e.g., using a cable tie) to the twist-lock fixing.

Figure 1:
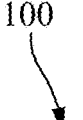
FIG. 1 is a schematic illustration of a system including a twist-lock fixing.

Referring initially to FIG. 1, provided is a schematic illustration of a system 100 including a twist-lock fixing 102. The system 100 (e.g., a modular rail mounting system) further includes a workpiece 170 (e.g., a support beam, a housing) and a component 150. The twist-lock fixing 102 includes a body section 110, a mounting section 120, and an object support 130. The object support 130 is configured to mount, support, and/or attach one or more components 150 (e.g., elongated articles, a bundle of elongated articles) to the workpiece 170. One or more of the body section 110, the mounting section 120, or the object support 130 may be integrally formed through an injection-molding process or another suitable process and of a suitably resilient material.

The workpiece 170 may be a support beam of the system 100, which includes a pair of spaced apart side rails that define a channel (e.g., mounting aperture 172) therebetween (e.g., a longitudinally extending T-slot). The twist-lock fixing 102 is utilized to attach the component 150 to the workpiece 170 via the mounting aperture 172 (e.g., a T-slot) that is defined in the workpiece 170.

The body section 110 may include a base, a spring section, and the like, and defines a recess 112 therein. The mounting section 120 is configured for mounting the twist-lock fixing 102 to the workpiece 170. The mounting section 120 includes a connector 122 that is configured to facilitate mounting the twist-lock fixing 102 to the workpiece 170. Examples of connectors for twist-lock fixings include, but are not limited to, fasteners, fir tree fasteners, blind hole fasteners, clamp fasteners, arrowhead fasteners, mechanical fasteners, twist-lock connectors, and edge clips. In one example, the connector 122 is a twist-lock connector configured for twist-lock engagement with the mounting aperture 172 of the workpiece 170. The connector 122 is configured to be positioned within the mounting aperture 172, positioned at a desired location along a length of the mounting aperture 172, and then rotated (e.g., a quarter turn, ninety (90°) degrees) relative to the mounting aperture 172 to cause the twist-lock fixing 102 to engage the workpiece 170 (e.g., at a support beam of the workpiece 170), locking the connector 122 into place within the mounting aperture 172. In this way, a position of the connector 122 is configured to move from an unengaged position to a transitional position to a locked position. Through a repositioning process, the connector can be unlocked and repositioned.

The mounting section 120 further includes a locking tab 124 (e.g., a torsional tab). The locking tab 124 may be a resilient locking tab. The locking tab 124 includes a free end that is configured to extend (e.g., deflect, bend) into the recess 112 defined in the body section 110 (e.g., in a flange of the body section 110) during the installation of the twist-lock fixing 102 on the workpiece 170. The recess 112 is configured to receive a portion of the locking tab 124 of the connector 122 (e.g., the free end). After the installation of the twist-lock fixing 102 on the workpiece 170 is complete, the portion of the locking tab 124 is withdrawn (e.g., unbends) from the recess and the locking tab 124 returns to a normal configuration and limits the rotation of the twist-lock fixing 102 in the mounting aperture 172 in a second direction that is opposite the first direction. In aspects, further rotation in the first direction is also limited. To describe it another way, as the twist-lock fixing 102 is further rotated from the transitional position to the locked position, the locking tab 124 unbends and the free end of the locking tab 124 unextends (e.g., retracts) from the recess 112 of a flange of the body section 110.

The object support 130 may be utilized to attach the component(s) 150 to the twist-lock fixing 102. Examples of object supports include, but are not limited to, clamps (e.g., mounting clamps, ratchet P-clamps), clips and other self-affixing clip fasteners (e.g., connector clips, bundling clips), mounts (e.g., saddle mounts, cradle mounts, cable tie mounts), and the like. The object support 130 may also include a moment arm or other structure configured to space an attached component 150 apart from the body section 110. In aspects, a twist-lock fixing 102 may not include an object support. The object support 130 may include a cable tie mount that includes an aperture (e.g., slot) that is configured to receive strapping material (e.g., cable tie, plastic band, flexible band, metal band, string, twine, wire, and the like, collectively a "cable tie" herein) that is utilized to connect the twist-lock fixing 102 to the component 150. In aspects, the cable tie is a fastener that is integrally formed with the object support 130.

One example of an object support 130 is a cradle mount. A cradle mount is configured to temporarily hold (e.g., by cradling) one or more components (collectively a "string") close to a desired mounting location (e.g., on a workpiece) while an installer is routing the components (e.g., while the components are being strung). Once the components are routed, the installer may then bundle the components together into one or more bundles. In aspects, the components are bundled through use of a cable tie. In this way, an installer does not need to use temporary strapping material to create temporary bundles. Instead, the installer can route all of the components and then apply the cable tie to create the bundle(s). Doing so avoids the need for the installer to, for every new component that is added to a string, remove temporary strapping material (e.g., by cutting a cable tie) and add new strapping material (e.g., add a new cable tie). This saves time and labor costs.

The component 150 may include one or more of a channel, a panel, a fixing, an elongated article (e.g., wire, cable, hose, tubing, pipe, fiber optic cable, conduit, wire harness assembly), and the like. Two or more components may be bundled together into a bundle.

Referring now to FIGS. 2-10, illustrated is a system 200 that includes a twist-lock fixing 202 and a workpiece 270. The system 200 is similar to the system 100 illustrated in FIG. 1 and described above, except as detailed below. Thus, the system 200 includes a twist-lock fixing 202, a body section 210, a recess 716, a mounting section 220, a connector 222, a locking tab 410, an object support 330, a workpiece 270, a mounting aperture (e.g., locking channel 272), and a component 390. In aspects, the twist-lock fixing 202 is configured to rotate ninety degrees (90°) from an unengaged position illustrated in FIGS. 2-4 to an engaged position illustrated in FIGS. 9 and 10. One or more of the body section 210, the mounting section 220, or the object support 330 may be integrally formed through an injection-molding process or another suitable process and of a suitably resilient material.

The workpiece 270 that is illustrated in FIGS. 2-9 is of a type that may be utilized with a modular rail mounting system (e.g., aluminum T-slotted framing system). The modular rail mounting system may include a support beam 274 (e.g., aluminum extrusion) having a pair of spaced apart side rails (first side rail 276, second side rail 278). The first side rail 276 includes a first arm 277 having a top surface 281 opposite a bottom surface 285. The second side rail 278 includes a second arm 279 having a top surface 283 opposite a bottom surface 287. The first arm 277 includes an end 273 and the second arm 279 includes an end 275, which face one another. The first side rail 276 and the second side rail 278 define a mounting aperture (e.g., locking channel 272) therebetween. The locking channel 272 may be defined between the end 273 of the first arm 277 and the end 275 of the second arm 279.

Figure 10:
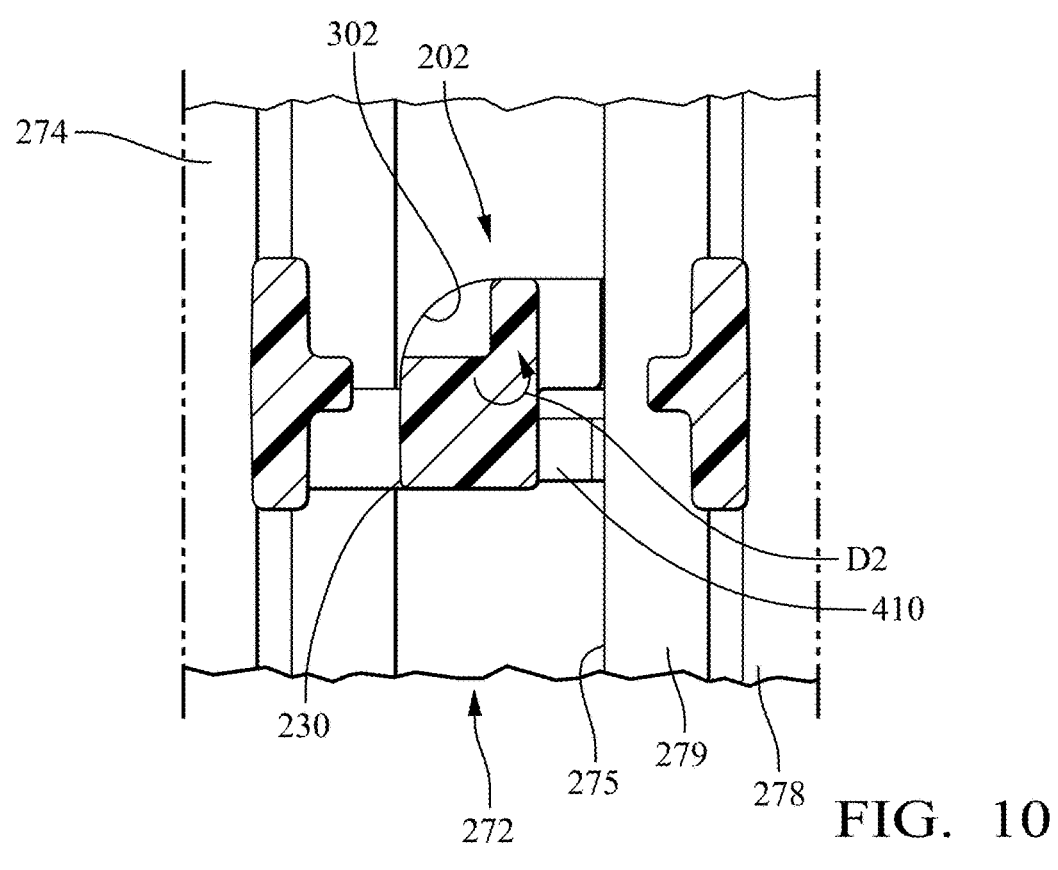
FIG. 10 is a top, cross-sectioned view of the system of FIG. 9, along lines 10-10, in the engaged position.

The locking channel 272 defines a longitudinally extending "T-slot" in the support beam 274. In this context, a "T-slot" may include a locking channel 272 with a narrow slot 280 that leads to a wide slot 282, where the wide slot 282 is wider than the narrow slot 280. The wide slot 282 can be rectangular-shaped, circular-shaped, half-moon-shaped, dove-tail-shaped, or other shapes. This configuration allows a connector 222 of the twist-lock fixing 202 to pass into the locking channel 272, through the narrow slot 280, with a head 240 of the connector 222 passing freely into the wide slot 282. In aspects, the support beam 274 may have an open end (not illustrated) and the connector 222 may pass into the T-slot through the open end instead of through the locking channel 272. In aspects, a position of the connector 222 is configured to move from an unengaged position (FIGS. 2-4) to a transitional position (FIGS. 5-8) to an engaged (e.g., locked) position (FIGS. 9 and 10).

The twist-lock fixing 202 includes the mounting section 220 configured for mounting the twist-lock fixing 202 on the workpiece 270. In the aspect illustrated in FIGS. 2-10, the mounting section 220 includes the connector 222 that is configured for receipt into the locking channel 272. The connector 222 may include a stem 224 that has a first end 226 opposite a second end 228. The connector 222 may be T-shaped. The connector 222 is configured to be inserted into the locking channel 272, from an end of the support beam 274 and/or through the narrow slot 280, and used to attach the component (illustrated in FIG. 3 as component 390) to the support beam 274. In a first example, the connector 222 includes a stem 224 and a head 240, where the stem 224 has a width narrower than the narrow slot 280 and the head 240 has a width in a first dimension that is narrower than the narrow slot 280 and a width in a second dimension that is wider than the narrow slot 280. In such a configuration, the head 240 can be inserted into the locking channel 272, pass through the narrow slot 280, and pass into the wide slot 282. With the head 240 in the wide slot 282, the twist-lock fixing 202 can be rotated in a first direction (D1) (e.g., first rotational direction) to reorient the head 240 from a parallel alignment with the locking channel 272 to an intersecting orientation that opposes withdrawal of the head 240 from the locking channel 272. The first direction (D1) may be clockwise.

The head 240 may include at least one shoulder (shoulder 342, shoulder 710) that is spaced apart from a flange 212. The shoulder is configured for supporting a bottom surface (bottom surface 285, bottom surface 287) of an arm (first arm 277, second arm 279), with the flange 212 contacting the top surface (top surface 281, top surface 283) of the arm and a portion of the arm sandwiched therebetween. In this way, the twist-lock fixing 202 is engaged within the locking channel 272. In aspects, the shoulder (shoulder 342, shoulder 710) defines a shoulder plane ($P_S$) of the head 240, which may be generally parallel to a flange plane ($P_F$) of the flange 212. In aspects, the shoulder (shoulder 342, shoulder 710) is orthogonal to a longitudinal axis (L) of the twist-lock fixing 202. For example, the shoulder plane may be orthogonal to a length of the stem 224.

The head 240 may include at least one ramp (ramp 346, ramp 510) that is configured for guiding the arm (first arm 277, second arm 279) onto the shoulder (shoulder 342, shoulder 710). Through this process, the ramp (ramp 346, ramp 510) may force the head 240 downward, deeper into the locking channel 272 and creating tension in the stem 224, which compresses the twist-lock fixing 202 and the support beam 274 together during installation.

The connector 222 includes a locking tab 410 (e.g., a torsional tab) that extends from a first side 436 of the stem 224. The locking tab 410 may be adjoined only by the first side 436 of stem 224. The locking tab 410 is configured to limit the rotation of the twist-lock fixing 202 in the locking channel 272 in a second direction (D2) (e.g., second rotational direction) when the twist-lock fixing 202 is in an installed position, for example, as is illustrated in FIGS. 9 and 10. The second direction (D2) is opposite to the first direction (D1). The second direction (D2) may be a counter-clockwise direction. The locking tab 410 may be flexible and resilient. As used herein, the following terms have the following meanings, unless the context clearly dictates otherwise. The term "flexible" refers to an object or material that is able to be bent, stretched, or compressed without cracking or breaking. The term "resilient" is used to qualify a flexible feature as generally returning to an initial general shape without permanent deformation after bending, stretching, and/or being compressed.

The locking tab 410 includes a free end 412 spaced apart from the stem 224. The locking tab 410 is configured to bend and extend (e.g., deflect) upwards (e.g., in an upward direction) to position the free end 412 in a recess 716 (e.g., a clearance gap) defined in the flange 212, as illustrated in FIGS. 6-8. As used herein, the terms "upwards" and "upward direction" refer to a direction towards the flange 212 and away from the head 240. The recess 716 is configured to receive the locking tab 410 or a portion thereof (e.g., a portion of the free end 412). The recess 716 faces the head 240. The recess 716 may define a roof 702 and the locking tab 410 (e.g., a portion of the free end 412) may contact the roof 702 of the recess 716. The locking tab 410 may be spaced apart from the shoulder (shoulder 342, shoulder 710) and may extend axially from the stem 224 generally parallel to the shoulder plane ($P_S$). The locking tab 410 may extend from the stem 224 orthogonal to the longitudinal axis (L) of the twist-lock fixing 202.

The body section 210 may attach to the connector 222 at the first end 226 of the stem 224. The body section 210 includes the flange 212 configured for contacting a first side of the workpiece 270 to limit a longitudinal insertion of the connector 222 into the locking channel 272. The flange 212 includes a lower side 214 that faces the head 240. The lower side 214 of the flange 212 includes the recess 716 defined therein.

Figure 2:
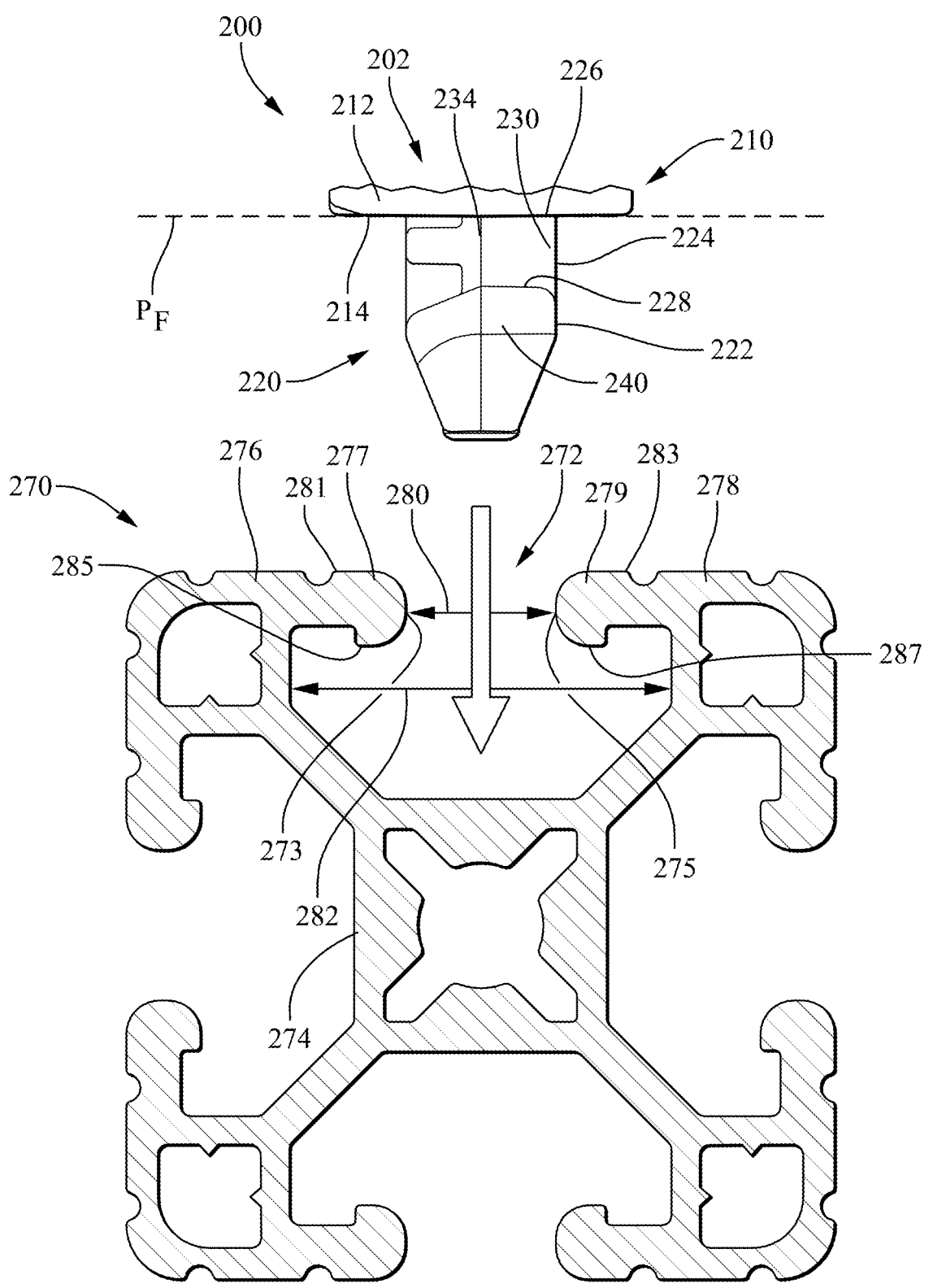
FIG. 2 is an exploded side view of a system including a twist-lock fixing.
Figures 3, 4A, 4B:
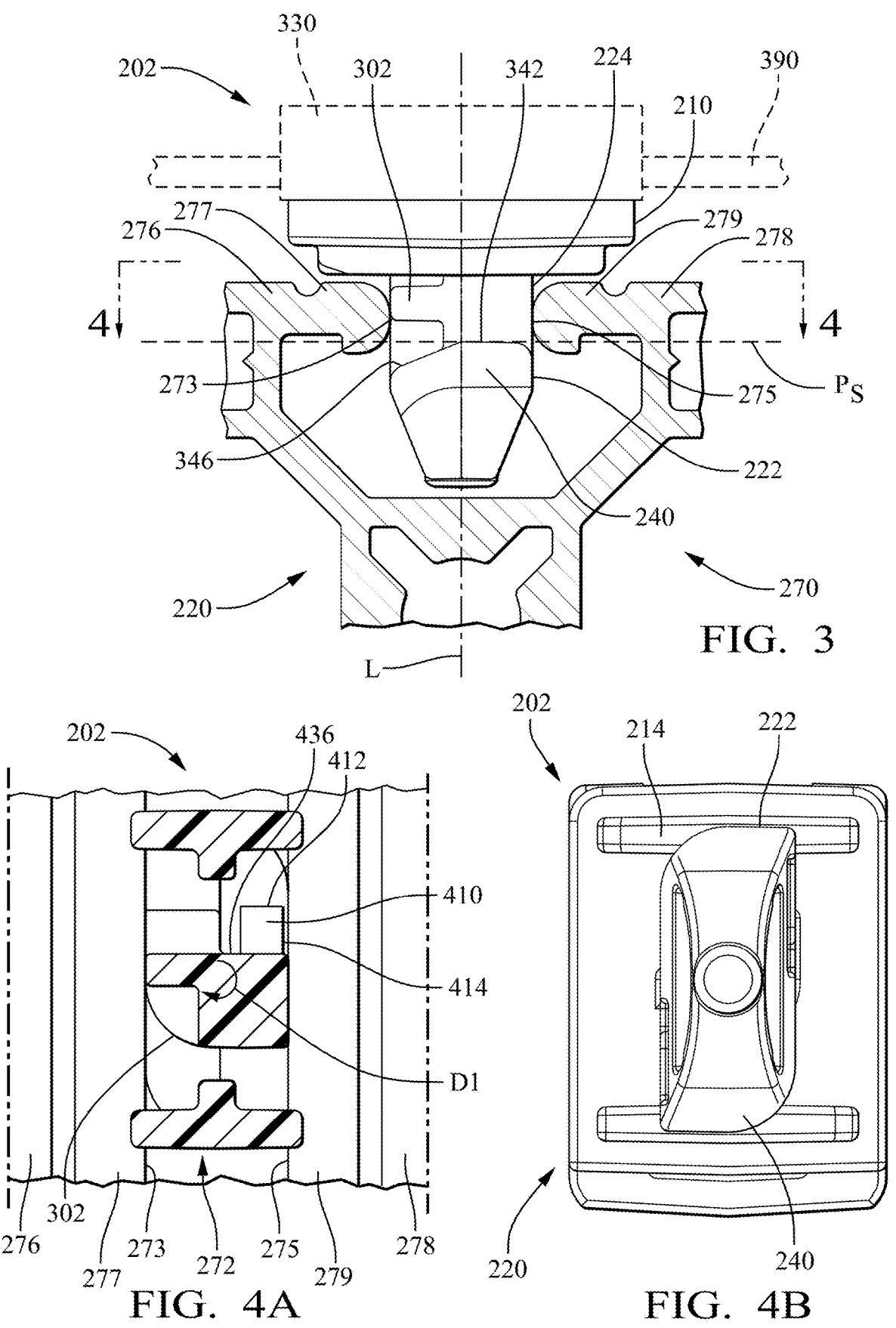
FIG. 3 is a partial, side view of the system of FIG. 2 in an inserted but disengaged position.
FIG. 4A is a top, cross-sectioned view of the system of FIG. 3, along lines 4-4, in the inserted but disengaged position.
FIG. 4B is a bottom view of the twist-lock fixing of FIG. 2.

FIGS. 2-4A and FIGS. 5-9 illustrate an installation sequence for the twist-lock fixing 202 in the locking channel 272 of the support beam 274. FIG. 2 is an exploded side view that shows the system 200 that includes the twist-lock fixing 202 and the support beam 274. FIGS. 3 and 4A illustrate the twist-lock fixing 202 positioned in the locking channel 272 in an inserted but disengaged position. In the disengaged position, the locking tab 410 extends from the first side 436 of the stem 224. In this position, the locking tab 410 may extend generally parallel to a longitudinal axis of the side rails (first side rail 276, second side rail 278). The twist-lock fixing 202 is configured for rotation in the first direction (D1) relative to the longitudinal axis (L) of the twist-lock fixing 202, as illustrated in FIG. 4A. In FIG. 3 and FIG. 4A, the twist-lock fixing 202 is configured for rotation in the first direction (D1) relative to the longitudinal axis (L) of the twist-lock fixing 202. FIG. 4B illustrates a bottom view of the twist-lock fixing 202.

In FIG. 3, the twist-lock fixing 202 is illustrated as including the object support 330 (e.g., object support 130 described above) that is configured for supporting the component 390 (e.g., component 150 described above). For example, the object support 330 may be configured for attaching the component 390 to the workpiece 270. The object support 330 and the component 390 are illustrated in dotted-line fashion.

In FIG. 4A, the locking tab 410 is in a normal configuration. In the normal configuration, the locking tab 410 has an initial general shape and may extend orthogonally from the stem 224. In aspects, a side of the locking tab 410 may include a cut-out (e.g., recessed portion 414) that is configured to be spaced apart from the end 275 of the second arm 279. The recessed portion 414 provides clearance between the locking tab 410 and the end 275 and/or the second arm 279, which enables initial unrestricted starting rotation.

The stem 224 may include at least one cammed surface (e.g., cammed surface 302) that is configured to rotate against the end (end 273, end 275) of a respective arm (first arm 277, second arm 279) during the rotation of the twist-lock fixing 202 in the locking channel 272, as illustrated in FIGS. 4A and 6. The stem 224 may include a first stop 230 that is configured to limit a rotation of the connector 222 in the locking channel 272 in the first direction (D1). The first stop 230 may be configured to stop against the end 273 of the first arm 277 of the support beam 274 (e.g., as illustrated in FIGS. 9 and 10). In this way, the first stop 230 may limit further rotation of the twist-lock fixing 202 in the locking channel 272 in the first direction (D1). The first stop 230 may be an abrupt sharp corner, which interferes with locking channel 272, that extends the full length of the stem 224 adjacent to the second side 234 of the stem 224.

Figure 5:
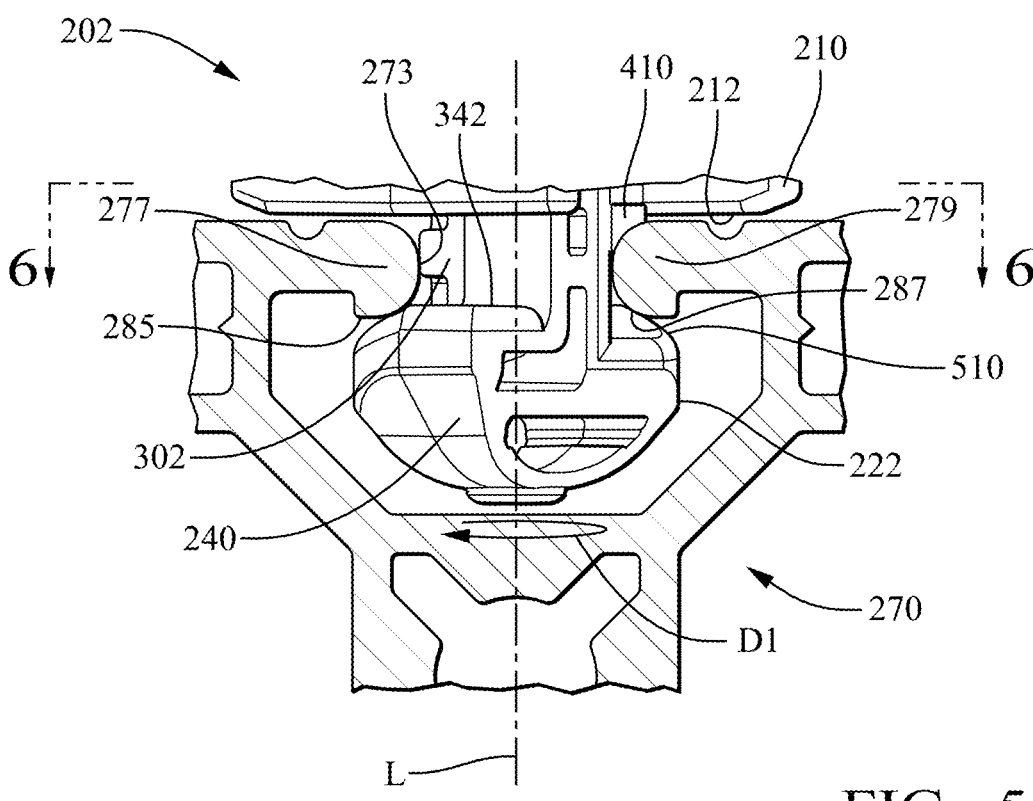
FIG. 5 is a partial, side view of the system of FIG. 2 in a first rotated position.
Figure 6:
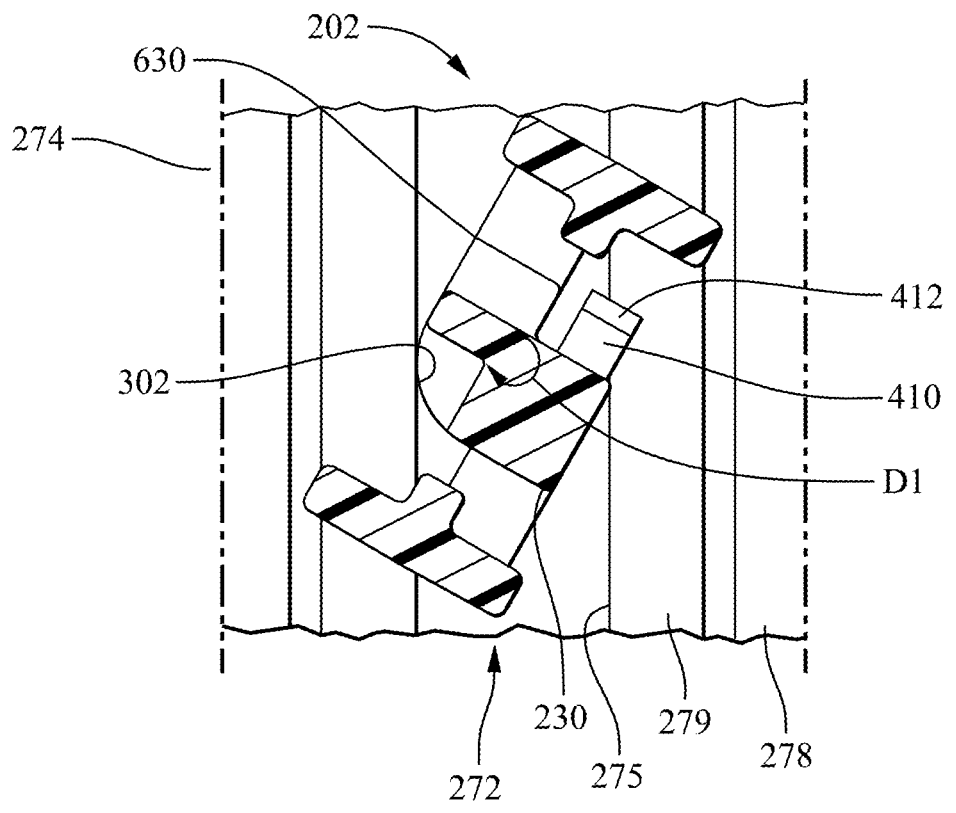
FIG. 6 is a top, cross-sectioned view of the system of FIG. 5, along lines 6-6, in the first rotated position.
Figures 7, 8, 9:
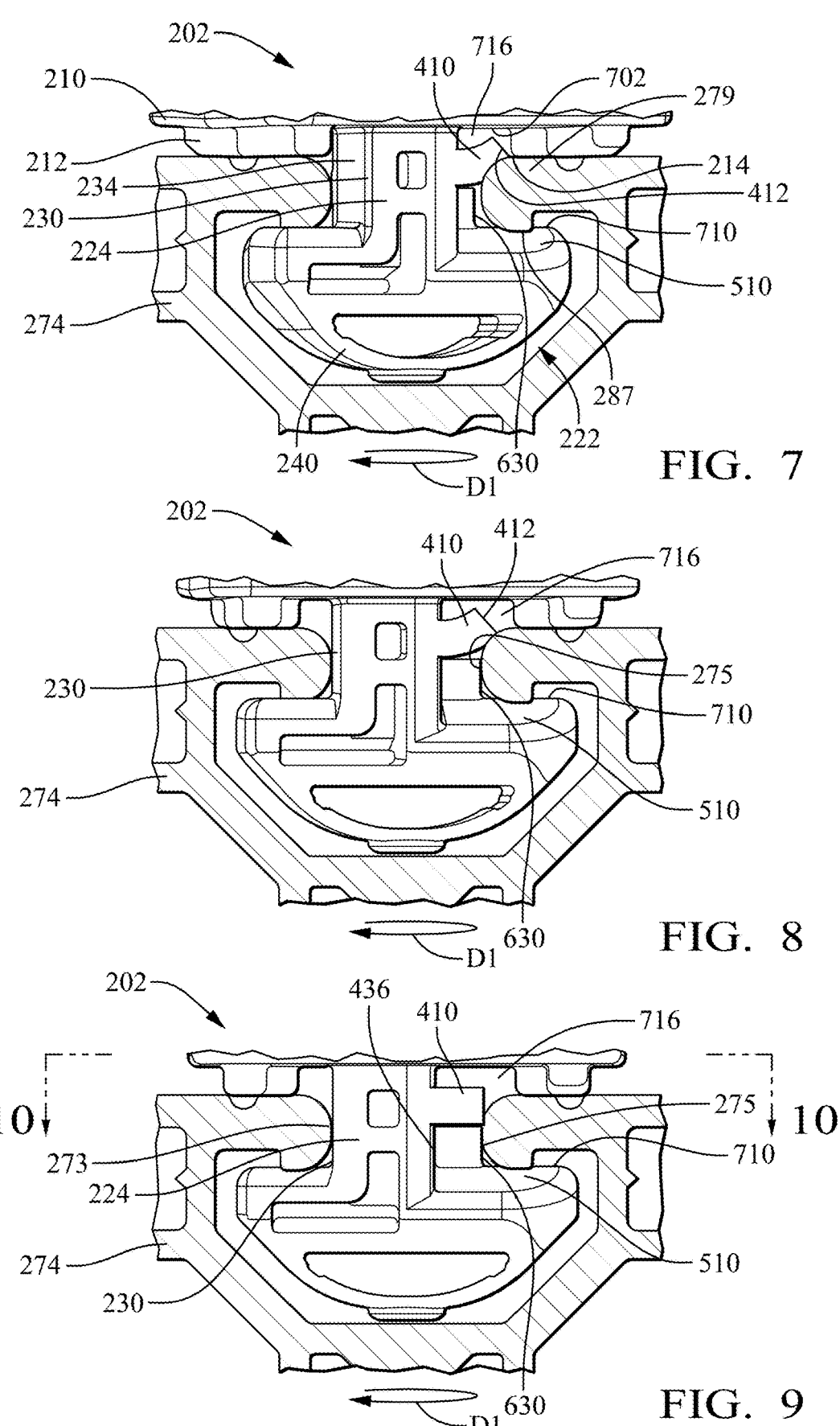
FIG. 7 is a partial, side view of the system of FIG. 2 in a second rotated position.
FIG. 8 is a partial, side view of the system of FIG. 2 in a third rotated position.
FIG. 9 is a partial, side view of the system of FIG. 2 in an engaged position.

FIG. 5 is a partial, side view of the system 200 of FIG. 2 in a first rotated position and FIG. 6 is a top, cross-sectioned view of the system 200 of FIG. 5, along lines 6-6, in the first rotated position. In FIGS. 5 and 6, the twist-lock fixing 202 has been rotated (e.g., sixty degrees (60°)) in the first direction (D1) relative to the longitudinal axis (L) of the twist-lock fixing 202. The free end 412 has been brought into contact with the end 275 of the second arm 279. In the aspect illustrated, the end 275 is radiused and the free end 412 tangentially contacts the radiused end 275 and slides upwards as the locking tab 410 is dragged along the radiused end. The friction between the locking tab 410 and the surface of the second arm 279 provides resistance (e.g., drag) while the twist-lock fixing 202 is rotated in the first direction. In this way, the locking tab 410 flexes in the upward direction, bending towards the flange 212, resulting in the locking tab 410 being in a bent configuration. In the bent configuration, the free end 412 of the locking tab 410 may extend (e.g., bend) out of the mounting aperture (e.g., locking channel 272) and may extend (e.g., bend) into the recess 716. The bottom surface 287 of the second arm 279 is brought into contact with the ramp 346 and moves up it. Likewise, the bottom surface 285 of the first arm 277 is brought into contact with the ramp 510 and moves up it. As a result, the first arm 277 and the second arm 279 are respectively compressed between the lower side 214 of the flange 212 and the ramp 346 and ramp 510.

FIGS. 5 and 6 illustrate the head 240 of the twist-lock fixing 202 positioned in the wide slot 282 in a first rotated position. In the first rotated position, the twist-lock fixing 202 has been partially rotated in the first direction (D1) relative to the longitudinal axis (L) of the twist-lock fixing 202. During the rotation, the free end 412 of the locking tab 410 contacts the second arm 279 of the second side rail 278 and flexes upwards, as illustrated in FIG. 6. In this way, the locking tab 410 rides on an upper surface of the second arm 279. During the rotation of the twist-lock fixing 202 in the locking channel 272, the cammed surface 302 may rotate against the end 273 of the first arm 277.

Figure 12A:
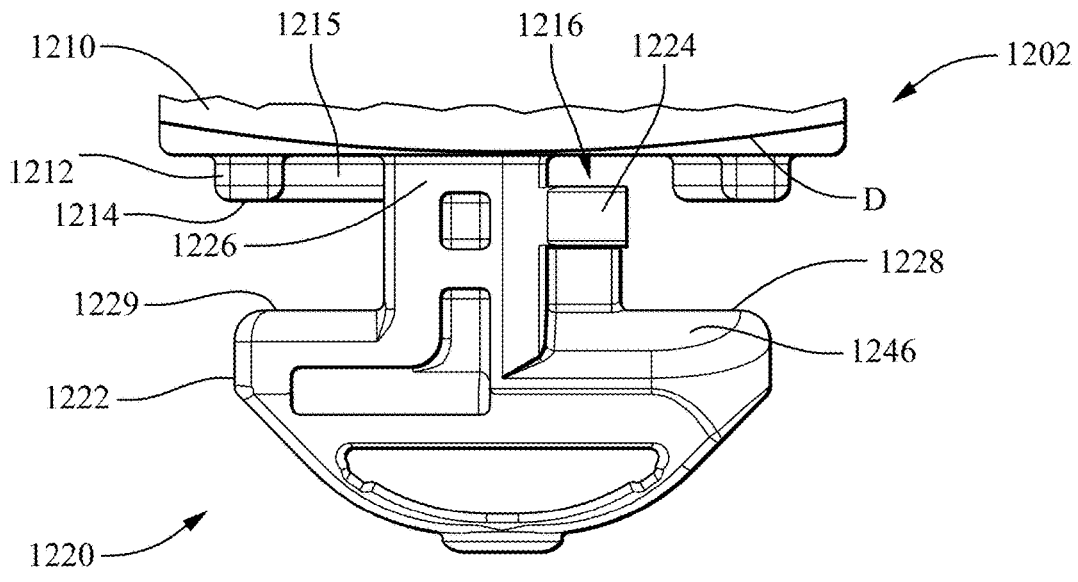
FIG. 12A is a partial, side view of a twist-lock fixing.

During the rotation of the twist-lock fixing 202 in the first direction (e.g., from the unengaged position and through a transitional position), the bottom surface 285 of the first arm 277 may ride up the ramp 346. While hidden from view in the illustrations of FIGS. 5 and 6, the bottom surface 287 of the second arm 279 may ride up the ramp 510. As the arms (first arm 277, second arm 279) ride up the ramps (ramp 346, ramp 510), the arms (first arm 277, second arm 279) may be compressively fit between the head 240 (e.g., ramp 346 of the head 240, ramp 510 of the head 240) and the lower side 214 of the flange 212. This may cause a noticeable drag while turning. The space between the shoulder (shoulder 342, shoulder 710) and the flange 212 may be narrower than a thickness of the arm (first arm 277, second arm 279) and the ramp (ramp 346, ramp 510) may be configured to permit a thicker arm (first arm 277, second arm 279) to rotate in-between the shoulder (shoulder 342, shoulder 740) and the flange 212. This narrower space (e.g., gap) may (a)

provide a mechanical advantage resulting in low applied hand force to fully rotate and install the twist-lock fixing 202, (b) wedge the arm (first arm 277, second arm 279) between the shoulder (shoulder 342, shoulder 740) and the flange 212, (c) hold the connector 222 tight onto the locking channel 272 and/or the workpiece 270—without wobbling, and/or (d) prevent rotation and migration of the connector 222 along the locking channel 272 and/or the workpiece 270. When the connector 222 is in compression, (e) the stem 224 may be in tension. When the connector 222 is in compression, (f) the body section 210 may bend, as illustrated in FIG. 12A with respect to twist-lock fixing 1202 as deflection (D). Natural deflection/bending of the body section 210 may occur when twist-lock fixing 202 is installed in locking channel 272. Features (e) and (f) may contribute to provide features (b), (c), and/or (d) listed above.

As the arms (first arm 277, second arm 279) ride up the ramps (ramp 346, ramp 510), the arms may be compressively fit between the ramps (ramp 346, ramp 510) and the lower side 214 of the flange 212. This may cause a noticeable drag while turning. In the transitional position and/or in the locked position, an arm (first arm 277, second arm 279) of the workpiece 270 may be compressively received in between the head 240 (e.g., shoulder 342 of the head 240, shoulder 710 of the head 240) and the flange 212. This compressive fit may resist at least one of rotational movement of the twist-lock fixing 202 in the locking channel 272 in the first direction; rotational movement of the twist-lock fixing 202 in the locking channel 272 in a second direction that is opposite the first direction; or movement of the twist-lock fixing 202 along the locking channel 272. The compressive fit may further cause the body section 210 (e.g., an outer portion of the flange 212, which is opposite the stem 224) to flex and the stem 224 to be held in tension, which may result in the connector 222 being held tight onto and/or within the locking channel 272, limiting the migration of the connector 222 in the locking channel 272. The twist-lock fixing 202 may further be configured for rotation from the locked position back into the transitional position through the application of a rotational force in a second direction that is opposite the first direction. The rotation from the locked position back into the transitional position may cause the locking tab 410 to bend and may cause the free end of the locking tab 410 to extend into the recess 716 of the flange 212.

FIG. 7 is a partial, side view of the system 200 of FIG. 2 in a second rotated position. In FIG. 7, the twist-lock fixing 202 has been rotated a number of additional degrees (e.g., fifteen degrees (15°)) in the first direction (D1) relative to the longitudinal axis (L) of the twist-lock fixing 202 in comparison to the aspect illustrated in FIGS. 5 and 6. In this view, the free end 412 continues to traverse the second arm 279 and bends further into the recess 716. In aspects, the locking tab 410 (e.g., the free end 412) may be compressed between the roof 702 of the recess 716 and a surface of the arm (e.g., second arm 279).

The stem 224 may include a second stop 630 that is configured to limit a rotation of the connector 222 in the locking channel 272 in at least one of the first direction (D1) or the second direction (D2). The second stop 630 may be configured to stop against the end 275 of the second arm 279 of the support beam 274 (e.g., as illustrated in FIGS. 9 and 10). In this way, the second stop 630 may limit further rotation of the twist-lock fixing 202 in the locking channel 272 in the first direction (D1). The locking tab 410 may be positioned between the first stop 230 and the second stop 630. The locking tab 410 and the second stop 630 may be similar in size and location.

As rotation continues, the free end 412 is extended (e.g., extends, deflects, bends, is deflected) into the recess 716, as is illustrated in FIG. 7. FIG. 7 illustrates the head 240 of the twist-lock fixing 202 positioned in the wide slot 282 in a second rotated position. In the second rotated position, the twist-lock fixing 202 has been further rotated in the first direction (D1) relative to the longitudinal axis (L) of the twist-lock fixing 202.

In FIG. 7, the second stop 630 has rotated into view. At least one of the stops (e.g., first stop 230, second stop 630) is configured to limit a rotation of the connector 222 in the locking channel 272 in the first direction (D1). For example, the stop (first stop 230, second stop 630) may be configured to stop against an end (end 273, end 275) of an arm (first arm 277, second arm 279) of the support beam 274, as illustrated in FIGS. 9 and 10. In this way, the first stop 230 and/or the second stop 630 may limit the further rotation of the twist-lock fixing 202 in the locking channel 272 in the first direction (D1). The first direction (D1) is illustrated in FIG. 4A.

As rotation further continues, the free end 412 continues to be extended into the recess 716, as is illustrated in FIG. 8. FIG. 8 illustrates the head 240 of the twist-lock fixing 202 positioned in the wide slot 282 in a third rotated position. In the third rotated position, the twist-lock fixing 202 has been further rotated in the first direction (D1) relative to the longitudinal axis (L) of the twist-lock fixing 202. The locking tab 410 may contact the roof 702 of the recess 716. In FIGS. 7 and 8, the locking tab 410 may be compressed between the roof 702 and a surface of the arm (e.g., second arm 279).

The connector 222 includes the head 240, which extends from the second end 228 of the stem 224. The head 240 is sized in a first dimension to be narrower than the narrow slot 280 to enable the head 240 to pass through the narrow slot 280 and into the wide slot 282. The head 240 is further sized in a second dimension to be wider than the narrow slot 280 to enable the head 240 to resist withdrawal of the connector 222, when in an installed position, from the locking channel 272. This configuration allows the connector 222 of the twist-lock fixing 202 to pass into the locking channel 272, through the narrow slot 280, with the head 240 of the connector 222 passing freely into the wide slot 282. In aspects, the support beam 274 may have an open end (not illustrated) and the connector 222 may pass into the T-slot through the open end instead of through the locking channel 272. The stem 224 includes a second side 234 opposite the first side 436. A first stop 230 may extend from the second side 234 of the stem 224. The twist-lock fixing 202 may include a second stop 630 that extends from the first side 436 of the stem 224. The second stop 630 may be spaced apart from the locking tab 410. The first stop 230 and/or the second stop 630 may be configured for limiting a rotation of the twist-lock fixing 202 in the locking channel 272 in the first direction (D1).

FIG. 8 is a partial, side view of the system 200 of FIG. 2 in a third rotated position. In FIG. 8, the twist-lock fixing 202 has been rotated a number of additional degrees (e.g., ten degrees (10°)) in the first direction (D1) relative to the longitudinal axis (L) of the twist-lock fixing 202 in comparison to the aspect illustrated in FIG. 7. At this point, the distance between the end 275 and the stem 224 increases, enabling the locking tab 410 to partially straighten, with the amount of the free end 412 that extends into the recess 716 decreasing.

FIG. 9 is a partial, side view of the system 200 of FIG. 2 in an engaged position and FIG. 10 is a top, cross-sectioned view of the system 200 of FIG. 9, along lines 10-10, in the engaged position. In FIG. 9, the twist-lock fixing 202 has been rotated a number of additional degrees (e.g., five degrees (5°)) in the first direction (D1) relative to the longitudinal axis (L) of the twist-lock fixing 202 in comparison to the aspect illustrated in FIG. 8 (e.g., rotated ninety degrees (90°) in the first direction (D1) relative to the longitudinal axis (L) of the twist-lock fixing 202 in comparison to the aspect illustrated in FIG. 4). At this point, the distance between the end 275 and the stem 224 is greater than a length of the locking tab 410, providing clearance that enables the locking tab 410 to resiliently straighten (e.g., unbend), transitioning from the bent configuration to the normal configuration. In aspects, the locking tab 410 may snap back into the normal configuration. In the normal configuration, the locking tab 410 limits and/or resists rotation of the twist-lock fixing 202 in the locking channel 272 in the second direction (D2) that is opposite the first direction (D1). As a result, the locking tab 410 locks the angular position of the twist-lock fixing 202 relative to the support beam 274, in the locked position. A low-hand force may be used to rotate the connector from the unengaged position (illustrated in FIGS. 2 and 3), through the transitional position (illustrated in FIGS. 4A-8), and into the locked position (illustrated in FIGS. 9 and 10); whereas a medium-hand force may be used to rotate the connector from the locked position (illustrated in FIGS. 9 and 10) back into a transitional position (illustrated in FIG. 8).

After being in the locked position illustrated in FIGS. 9 and 10 where the locking tab 410 is straight, the locking tab 410 may be further configured to flex upwards upon an application of a sufficient rotational force (e.g., a medium-hand force) in the second direction (D2). The locking tab 430 may provide a forced flexibility in an attempt to bend back into the recess 716 (e.g., as illustrated in the sequence from FIG. 9 back to FIG. 8) upon application of the rotational force (e.g., a medium-hand force, a ninety degree (90°) rotation) in the second direction (D2) (e.g., counter-clockwise) that overcomes perpendicular compression contact of the free end 412 rotating against the inner width rails (e.g., end 273, end 275) of locking channel 272. In other aspects, the second stop 630 may be adjoined by two sides (e.g., the first side 436 of the stem 224 and the engaging surface (e.g. shoulder 710) of the T-shaped connector), which together combined may be considered "rigid" for flexibility.

Figure 11A:
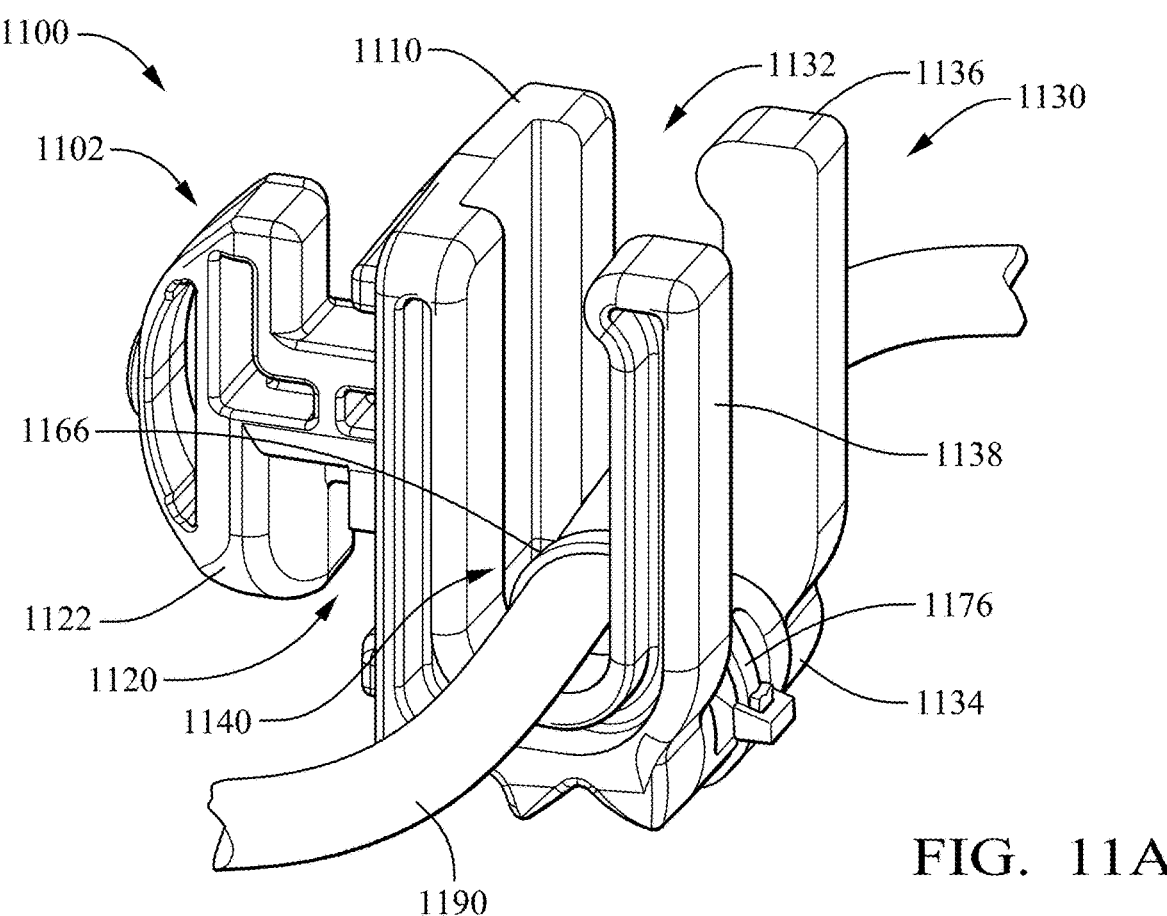
FIG. 11A is a front perspective view of a twist-lock fixing.
Figures 11B, 11C:
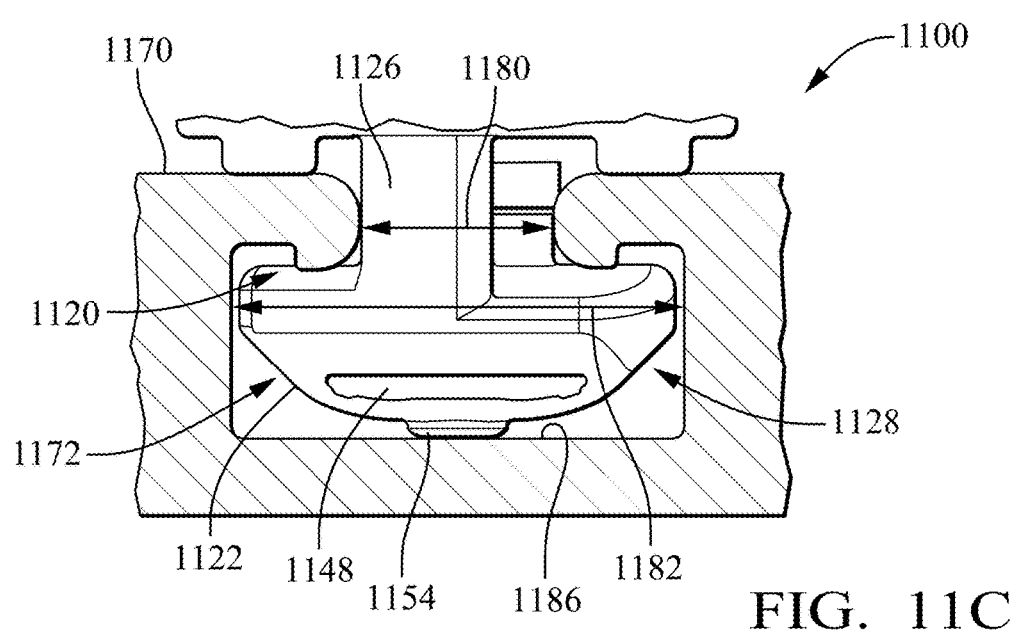
FIG. 11B is a rear perspective view of the twist-lock fixing of FIG. 11A.
FIG. 11C is an environmental, cross-sectioned view of the twist-lock fixing of FIG. 11A.

Referring now to FIGS. 11A, 11B, and 11C, illustrated is a system 1100 including a twist-lock fixing 1102, a work-piece 1170, and a component 1190, the twist-lock fixing 1102 configured for attachment to the workpiece 1170. FIG. 11A is a front perspective view of the twist-lock fixing 1102, FIG. 11B is a rear perspective view of the twist-lock fixing 1102, and FIG. 11C is a side view of the twist-lock fixing 1102 installed to the workpiece 1170. The system 1100 is similar to the systems (system 100, system 200) illustrated in FIG. 1 and FIG. 2, which are described above, except as detailed below. Thus, the system 1100 includes the twist-lock fixing 1102, a body section 1110, a recess 1112, a mounting section 1120, a connector 1122, a locking tab 1124, a stem 1126, an object support 1130, a head 1128, the workpiece 1170, a locking channel 1172, a support beam 1174, a narrow slot 1180, and a wide slot 1182, and a component 1190.

In the twist-lock fixing 1102, the object support 1130 is a cradle mount object support that includes a cradle portion 1132 that is configured for receiving, securing, and/or supporting one or more components (e.g., component(s) 1190). The system 1100 may further include one or more cable ties 1176 that are used to bundle the component 1190 and/or to hold a bundle of one or more components to the object support 1130.

The cradle portion 1132 is illustrated with a cradle geometry including a stand-off member 1134 and at least one receiver arm (receiver arm 1136, receiver arm 1138). The stand-off member 1134 is configured for spacing the at least one receiver arm (receiver arm 1136, receiver arm 1138) apart from the body section 1110 to define at least one cradle 1140 therebetween. The receiver arm (receiver arm 1136, receiver arm 1138) is configured for retaining the component 1190 (e.g., bundle) in the cradle 1140. In aspects, a receiver arm may be hook-shaped and/or may include one or more retention cleats extending from an end of the receiver arm and towards the cradle 1140 for retaining the component 1190 in the cradle 1140.

Bundles of components may be tightly bound (compressively) with a cable tie. For example, in the aspect illustrated in FIGS. 11A and 11B, the cable tie 1176 extends through a strap passage 1166 (e.g., a tie slot) defined through the body section 1110, around the stand-off member 1134, and over the component 1190 held in the cradle 1140 of the cradle portion 1132. In such an instance, it can be difficult to cut the cable tie 1176 without damaging (e.g., nicking) one or more of the components in the bundle. The twist-lock fixing 1102 may include at least one cutting guide 1160 configured for supporting the cable tie 1176 spaced apart from the twist-lock fixing 1102 and configured for receiving a cutting tool (not illustrated) therein. The cutting guide 1160 includes features and/or geometry configured to protect an elongated article from damage when cutting off a cable tie 1176 attached to a bundle held in the cradle portion 1132 of the twist-lock fixing 1102. The cutting guide 1160 may be indicated through grooves defined in the cradle portion 1132 of the twist-lock fixing 1102. In the aspect illustrated in FIGS. 11A and 11B, the cutting guide 1160 includes a first flange 1162 spaced apart from a second flange 1164, which define a cutting zone therebetween. The cutting zone forms a guide for an installer to remove a cable tie from a bundle using a cutting device (e.g., a diagonal plier tool, wire cutters, side cutters) (e.g., to guide the sharp tips of the installer's diagonal pliers against while applying a cutting force to the handles of the diagonal pliers). In this way, damage to a component (e.g., an elongated article) caused when removing a cable tie (e.g., by cutting) is prevented.

The mounting section 1120 is configured for mounting the twist-lock fixing 1102 on the workpiece 1170. The mounting section 1120 includes a connector 1122 that is configured for receipt into a locking channel 1172 of the workpiece 1170. The connector 1122 may be T-shaped, including a stem 1126 and a head 1128. The connector 1122 is configured to be inserted into the locking channel 1172 through the narrow slot 1180 and is used to attach the component 1190 to the support beam 1174. The connector 1122 includes a stem 1126 and a head 1128, where the stem 1126 has a width narrower than the narrow slot 1180 and the head 1128 has a width in a first dimension that is narrower than the narrow slot 1180 and a width in a second dimension that is wider than the narrow slot 1180. In such a configuration, the head 1128 can be inserted into the locking channel 1172, pass through the narrow slot 1180, and pass into the wide slot 1182. With the head 1128 in the wide slot 1182, the twist-lock fixing 1102 can be rotated in a first direction to reorient the head 1128 from a parallel alignment with the locking channel 1172 to an intersecting orientation that opposes withdrawal of the head 1128 from the locking channel 1172, as illustrated in FIG. 11C.

The head 1128 may include a compressible portion 1148 that is configured to collapse (e.g., a void defined within the head 1128). The compressible portion 1148 may be configured for compression upon a tip of the head 1128 contacting a bottom 1186 of the locking channel 1172. The compressible portion 1148 may be resilient. Through the compression of the compressible portion 1148 of the head 1128, tension may be created in the stem 1126, which compresses the twist-lock fixing 1102 and the support beam 274 together during installation. The head 1128 may further include a rotational pad 1154, which is configured for rotational engagement with a surface within the locking channel 1172 (e.g., a bottom 1186). The rotational pad 1154 may function as a reinforcement of the head 1128.

Figure 12B:
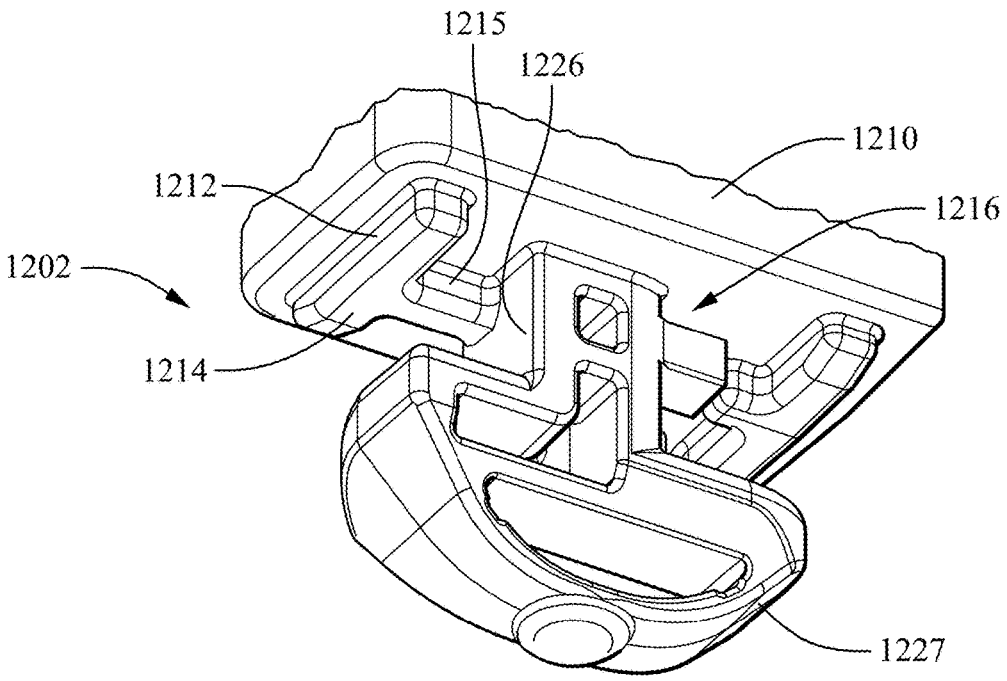
FIG. 12B is a partial, perspective view of the twist-lock fixing of FIG. 12A.
Figure 12C:
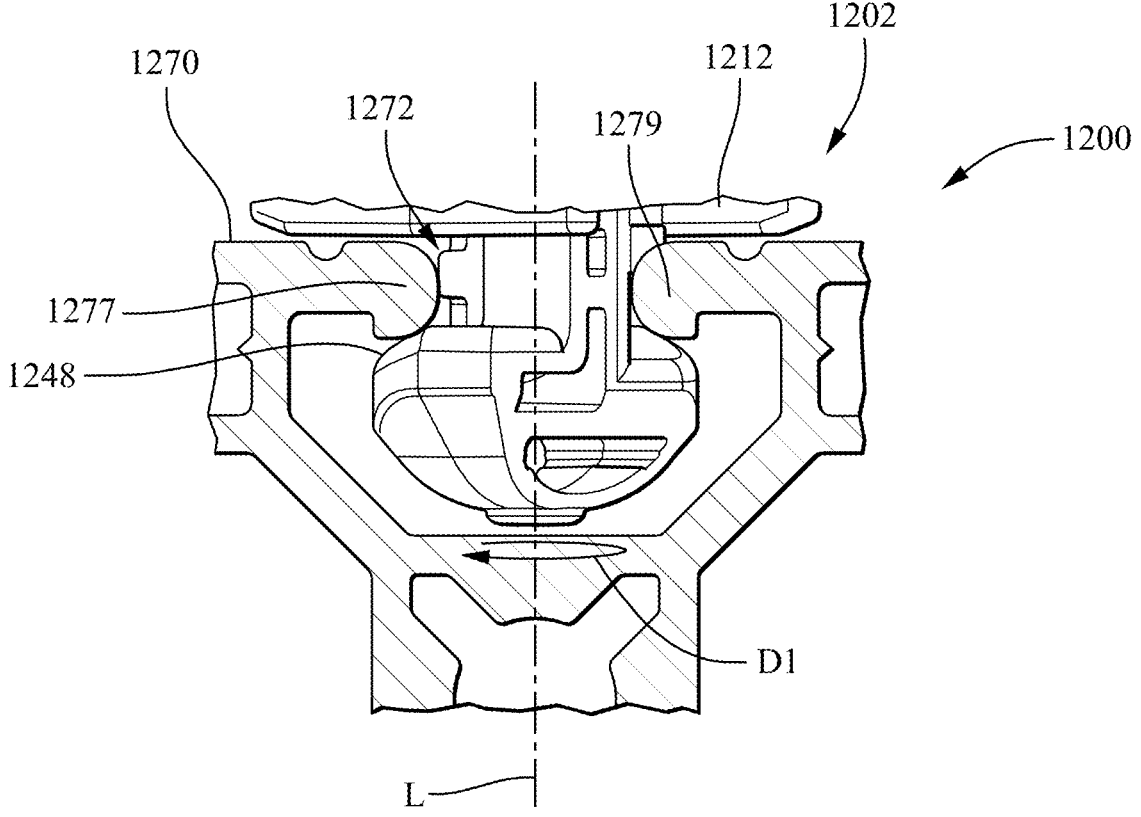
FIG. 12C is a partial, side view of a system including the twist-lock fixing of FIG. 12A, in a rotated position.

Referring now to FIGS. 12A, 12B, and 12C, illustrated is an additional aspect of a twist-lock fixing 1202 that can be used in a system (e.g., system 100, system 200, system 1100, system 1200) that includes a workpiece (e.g., workpiece 170, workpiece 270, workpiece 1170, workpiece 1270) and a component (e.g., component 190, component 290, component 1190). FIG. 12A is a partial, side view of a twist-lock fixing 1202, FIG. 12B is a partial, perspective view of the twist-lock fixing 1202, and FIG. 12C is a partial, side view of the system 1200 including the twist-lock fixing 1202 and the workpiece 1270, with the twist-lock fixing 1202 illustrated in a rotated position. The twist-lock fixing 1202 configured for attachment to the workpiece 1270. The system 1200 is similar to the systems (system 100, system 200, system 1100) described above and illustrated in the Drawings, except as detailed below. Thus, the system 1200 includes the twist-lock fixing 1202, a body section 1210, a flange 1212, a lower side 1214, a recess 1216, a mounting section 1220, a connector 1222, a locking tab 1224, a stem 1226, a head 1227, a shoulder (shoulder 1228, shoulder 1229), an object support (not illustrated), a ramp (ramp 1246, ramp 1248), the workpiece 1270, a locking channel 1272, an arm (first arm 1277, second arm 1279), and a component (not illustrated).

In the aspect illustrated in FIGS. 12A-12C, the space between the shoulder (shoulder 1228, shoulder 1229) and the flange 1212 may be narrower than a thickness of the arm (first arm 1277, second arm 1279) and the ramp (ramp 1246, ramp 1248) may be configured to permit a thicker arm (first arm 1277, second arm 1279) to rotate in-between the shoulder (shoulder 1228, shoulder 1229) and the flange 1212. This narrower space (e.g., gap) may (a) provide a mechanical advantage resulting in low applied hand force to fully rotate and install the twist-lock fixing 1202 (e.g., as described above with respect to FIGS. 2-10), (b) wedge the arm (first arm 1277, second arm 1279) between the shoulder (shoulder 1228, shoulder 1229) and the flange 1212, (c) hold the connector 1222 tight onto the locking channel 1272 and/or the workpiece 1270—without wobbling, and/or (d) prevent rotation and migration of the connector 1222 along the locking channel 1272 and/or the workpiece 1270. When the connector 1222 is in compression, (e) the stem 1226 may be in tension. When the connector 1222 is in compression, (f) the body section 1210 may bend, as illustrated in FIG. 12A as deflection (D). Natural deflection/bending of the body section 1210 may occur when twist-lock fixing 1202 is installed in locking channel 1272. Features (e) and (f) may contribute to provide features (b), (c), and/or (d) listed above. As the arms (first arm 1277, second arm 1279) ride up the ramps (ramp 1246, ramp 1248), the arms (first arm 1277, second arm 1279) may be compressively fit between the head 1227 (e.g., ramp 1246 of the head 1227, ramp 1248 of the head 1227) and the lower side 1214 of the flange 1212. This may cause a noticeable drag while turning.

In the transitional position and/or in the locked position, an arm (first arm 1277, second arm 1279) of the workpiece 1270 may be compressively received in between the head 1227 (e.g., shoulder 1228 of the head 1227, shoulder 1229 of the head 1227) and the flange 1212. This compressive fit may resist at least one of rotational movement of the twist-lock fixing 1202 in the locking channel 1272 in the first direction; rotational movement of the twist-lock fixing 1202 in the locking channel 1272 in a second direction that is opposite the first direction; or movement of the twist-lock fixing 1202 along the locking channel 1272. The compressive fit may further cause the body section 1210 (e.g., an outer portion of the flange 1212, which is opposite the stem 1226) to flex and the stem 1226 to be held in tension, which may result in the connector 1222 being held tight onto and/or within the locking channel 1272, limiting the migration of the connector 1222 in the locking channel 1272.

The twist-lock fixing 1202 may further be configured for rotation from the locked position back into the transitional position through the application of a rotational force in a second direction that is opposite the first direction. The rotation from the locked position back into the transitional position may cause the locking tab 1224 to bend and may cause the free end of the locking tab 1224 to extend into the recess 1216 of the flange 1212.

The amount of connector 1222 compression on the arm (arm 1277, arm 1279) may, in-part, be controlled by the inclusion of an adjoining rib 1215 positioned between the flange 1212 and the stem 1226. The size and length of the rib 1215 may factor into the rigidity and reinforcement that the rib 1215 provides to the body section 1210. The rib 1215 may not eliminate body section 1210 deflection and/or bending, but the rib 1215 may change and/or redistribute the contact forces occurring between the twist-lock components engaging with the locking channel 1272 and arm (first arm 1277, second arm 1279). The addition of the rib 1215 may increase the compression force on the arm (first arm 1277, second arm 1279) by a percentage amount that is proportional to the size and length of the rib 1215. The increased compression force provides increased holding strength to prevent the connector 1222 from wobbling, rotating, and/or migrating along the locking channel 1272. Joining the rib 1215 from the flange 1212 to the stem 1226 may reinforce the support of the stem 1226.

Materials

Components of the disclosed twist-lock fixings may be fabricated of any suitably resilient material, including polymeric material. A suitable polymeric material may include one or more of polyamide, polyamide 6.6, nylon 6, nylon, polypropylene, polyphenylene sulfide (PPS), and the like, and polymers thereof.

Additional Examples

Some additional examples of twist-lock fixings are provided in this section.

Example 1. A twist-lock fixing configured for attaching to a workpiece at a locking channel defined in the workpiece, the twist-lock fixing comprising: a connector configured for receipt into the locking channel, the connector comprising: a stem having a first end opposite a second end, the stem comprising: a locking tab extending from a first side of the stem; and a head, the head extending from the second end of the stem, the head spaced apart from the locking tab; and a body section, the body section attaching to the connector at the first end of the stem, the body section comprising: a flange configured for contacting a first side of the workpiece to limit a longitudinal insertion of the connector into the locking channel.

Example 2. The twist-lock fixing of any preceding Example, wherein the flange includes a lower side that faces the head, the lower side of the flange defining a recess configured to receive a free end of the locking tab, the free end spaced apart from the stem.

Example 3. The twist-lock fixing of any preceding Example, wherein as the twist-lock fixing is rotated in a first direction from an unengaged position to a transitional position, the locking tab bends and the free end of the locking tab extends into the recess of the flange.

Example 4. The twist-lock fixing of any preceding Example, wherein as the twist-lock fixing is further rotated from the transitional position to a locked position, the locking tab unbends and the free end of the locking tab unextends from the recess of the flange.

Example 5. The twist-lock fixing of any preceding Example, wherein in the transitional position, an arm of the workpiece is compressively received in between the head and the flange, resisting at least one of: rotational movement of the twist-lock fixing in the locking channel in the first direction; rotational movement of the twist-lock fixing in the locking channel in a second direction that is opposite the first direction; or movement of the twist-lock fixing along the locking channel.

Example 6. The twist-lock fixing of any preceding Example, wherein in the locked position the locking tab is positioned to contact the locking channel to limit the rotation of the twist-lock fixing in the locking channel in a second direction that is opposite the first direction.

Example 7. The twist-lock fixing of any preceding Example, wherein the twist-lock fixing is further configured for rotation from the locked position back into the transitional position through the application of a rotational force in a second direction that is opposite the first direction, and wherein rotation from the locked position back into the transitional position causes the locking tab to bend and causes the free end of the locking tab to extend into the recess of the flange.

Example 8. The twist-lock fixing of any preceding Example, wherein in the locked position, an arm of the workpiece is compressively received in between the head and the flange, resisting at least one of: rotational movement of the twist-lock fixing in the locking channel in the first direction; rotational movement of the twist-lock fixing in the locking channel in a second direction that is opposite the first direction; or movement of the twist-lock fixing along the locking channel.

Example 9. The twist-lock fixing of any preceding Example, wherein the stem further comprises: a first stop configured for limiting a rotation of the connector in the locking channel in a first direction, the first stop extending from a second side of the stem, the second side of the stem opposite the first side of the stem.

Example 10. The twist-lock fixing of any preceding Example, further comprising: a second stop configured for limiting a rotation of the twist-lock fixing in the locking channel in the first direction, the second stop extending from the first side of the stem, the second stop spaced apart from the locking tab.

Example 11. The twist-lock fixing of any preceding Example, wherein the workpiece includes an arm having a top surface opposite a bottom surface, wherein the flange includes a lower side that faces the head, the lower side of the flange defining a flange plane, and wherein the head further comprises at least one shoulder spaced apart from the flange, the shoulder defining a shoulder plane, the shoulder plane generally parallel to the flange plane, the shoulder orthogonal to the stem and configured for supporting the bottom surface of the arm with the flange contacting the top surface of the arm, with a portion of the arm sandwiched therebetween.

Example 12. The twist-lock fixing of any preceding Example, wherein the head further comprises: at least one ramp configured for guiding the arm onto the shoulder.

Example 13. The twist-lock fixing of any preceding Example, wherein the connector is T-shaped and the locking channel is a T-slot locking channel.

Example 14. The twist-lock fixing of any preceding Example, wherein the twist-lock fixing further comprises: an object support configured for supporting a component.

Example 15. The twist-lock fixing of any preceding Example, wherein the object support is a cradle mount defining a channel configured for receiving the component, the cradle mount comprising: at least one receiver arm configured for retaining the component in the channel; and a stand-off member extending from the body section, the stand-off member configured for spacing the receiver arm apart from the body section to define the channel.

Example 16. A twist-lock fixing configured for attaching to a workpiece at a locking channel defined in the workpiece, the twist-lock fixing comprising: a connector configured for receipt into the locking channel, the connector comprising: a stem having a first end opposite a second end, the stem comprising: a locking tab extending from a first side of the stem, the locking tab including a free end spaced apart from the stem; a first stop configured for limiting a rotation of the connector in the locking channel in a first direction, the first stop extending from a second side of the stem, the second side of the stem opposite the first side of the stem; and a second stop configured for limiting a rotation of the twist-lock fixing in the locking channel in the first direction, the second stop extending from the first side of the stem, the second stop spaced apart from the locking tab; and a head, the head extending from the second end of the stem, the head spaced apart from the locking tab; and a body section, the body section attaching to the connector at the first end of the stem, the body section comprising: a flange configured for contacting a first side of the workpiece to limit a longitudinal insertion of the connector into the locking channel, the flange including a lower side that faces the head, the lower side of the flange defining a recess configured to receive the free end of the locking tab, wherein as the twist-lock fixing is rotated from an unengaged position to a transitional position, the locking tab bends and the free end of the locking tab extends into the recess of the flange, wherein as the twist-lock fixing is further rotated from the transitional position to a locked position, the locking tab unbends and the free end of the locking tab unextends from the recess of the flange, and wherein in the locked position the locking tab is positioned to contact the locking channel to limit the rotation of the twist-lock fixing in the locking channel in a second direction that is opposite the first direction.

Example 17. The twist-lock fixing of any preceding Example, wherein the connector and the body section are integrally formed through an injection-molding process.

Example 18. A twist-lock fixing configured for attaching to a workpiece at a locking channel defined in the workpiece, the twist-lock fixing comprising: a connector configured for receipt into the locking channel, the connector comprising: a stem having a first end opposite a second end, the stem comprising: a locking tab extending from a first side of the stem, the locking tab including a free end spaced apart from the stem; and a head, the head extending from the second end of the stem, the head spaced apart from the locking tab; a body section, the body section attaching to the connector at the first end of the stem, the body section comprising: a flange configured for contacting a first side of the workpiece to limit a longitudinal insertion of the connector into the locking channel, the flange including a lower side that faces the head, the lower side of the flange defining a recess configured to receive the free end of the locking tab; and an object support configured for supporting a component, the object support being a cradle mount defining a channel configured for receiving the component, the object support comprising: at least one receiver arm configured for retaining the component in the channel; and a stand-off member extending from the body section, the stand-off member configured for spacing the receiver arm apart from the body section to define the channel, wherein as the twist-lock fixing is rotated from an unengaged position to a transitional position, the locking tab bends and the free end of the locking tab extends into the recess of the flange, wherein as the twist-lock fixing is further rotated from the transitional position to a locked position, the locking tab unbends and the free end of the locking tab unextends from the recess of the flange, and wherein in the locked position the locking tab is positioned to contact the locking channel to limit the rotation of the twist-lock fixing in the locking channel in a second direction that is opposite the first direction.

Example 19. The twist-lock fixing of any preceding Example, wherein the stem further comprises: a first stop configured for limiting a rotation of the connector in the locking channel in a first direction, the first stop extending from a second side of the stem, the second side of the stem opposite the first side of the stem; and a second stop configured for limiting a rotation of the twist-lock fixing in the locking channel in the first direction, the second stop extending from the first side of the stem, the second stop spaced apart from the locking tab.

Example 20. The twist-lock fixing of any preceding Example, wherein the connector and the body section are integrally formed through an injection-molding process.

Example 21. The twist-lock fixing of any preceding Example, wherein the locking tab extends axially from the stem parallel to a plane of the head.

Example 22. The twist-lock fixing of any preceding Example, wherein the locking tab extends from the stem orthogonal to a longitudinal axis of the stem.

Example 23. The twist-lock fixing of any preceding Example, wherein the connector and the body section are integrally formed through an injection-molding process.

Alternative Language

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for twist-lock fixings have been described in language specific to certain features and/or methods, the subject of the appended claims is not necessarily limited to the specific features or methods described. Rather, the specific features and methods are disclosed as example implementations for twist-lock fixings.

What is claimed is:

1. A twist-lock fixing configured for attaching to a workpiece at a locking channel defined in the workpiece, the twist-lock fixing comprising:
a connector configured for receipt into the locking channel, the connector comprising:
a stem having a first end opposite a second end, the stem comprising:
a first side surface; and
a locking tab extending from the first side surface of the stem; and
a head, the head extending from the second end of the stem, the head spaced apart from the locking tab; and
a body section, the body section attaching to the connector at the first end of the stem, the body section comprising:
a flange configured for contacting a first side of the workpiece to limit a longitudinal insertion of the connector into the locking channel.

2. The twist-lock fixing of claim 1, wherein the flange includes a lower side that faces the head, the lower side of the flange defining a recess configured to receive a free end of the locking tab, the free end spaced apart from the stem.

3. The twist-lock fixing of claim 2, wherein as the twist-lock fixing is rotated in a first direction from an unengaged position to a transitional position, the locking tab bends and the free end of the locking tab extends into the recess of the flange.

4. The twist-lock fixing of claim 3, wherein as the twist-lock fixing is further rotated from the transitional position to a locked position, the locking tab unbends and the free end of the locking tab unextends from the recess of the flange.

5. The twist-lock fixing of claim 4, wherein in the transitional position, an arm of the workpiece is compressively received in between the head and the flange, resisting at least one of:
rotational movement of the twist-lock fixing in the locking channel in the first direction;
rotational movement of the twist-lock fixing in the locking channel in a second direction that is opposite the first direction; or
movement of the twist-lock fixing along the locking channel.

6. The twist-lock fixing of claim 4, wherein in the locked position the locking tab is positioned to contact the locking channel to limit the rotation of the twist-lock fixing in the locking channel in a second direction that is opposite the first direction.

7. The twist-lock fixing of claim 4,
wherein the twist-lock fixing is further configured for rotation from the locked position back into the transitional position through an application of a rotational force in a second direction that is opposite the first direction, and
wherein rotation from the locked position back into the transitional position causes the locking tab to bend and causes the free end of the locking tab to extend into the recess of the flange.

8. The twist-lock fixing of claim 4, wherein in the locked position, an arm of the workpiece is compressively received in between the head and the flange, resisting at least one of:
rotational movement of the twist-lock fixing in the locking channel in the first direction;
rotational movement of the twist-lock fixing in the locking channel in a second direction that is opposite the first direction; or
movement of the twist-lock fixing along the locking channel.

9. The twist-lock fixing of claim 1, wherein the stem further comprises:
a first stop configured for limiting a rotation of the connector in the locking channel in a first direction, the first stop extending from a second side surface of the stem, the second side surface of the stem opposite the first side surface of the stem.

10. The twist-lock fixing of claim 9, further comprising:
a second stop configured for limiting a rotation of the twist-lock fixing in the locking channel in the first direction, the second stop extending from the first side surface of the stem, the second stop spaced apart from the locking tab.

11. The twist-lock fixing of claim 1,
wherein the workpiece includes an arm having a top surface opposite a bottom surface,
wherein the flange includes a lower side that faces the head, the lower side of the flange defining a flange plane, and
wherein the head further comprises at least one shoulder spaced apart from the flange, the shoulder defining a shoulder plane, the shoulder plane generally parallel to the flange plane, the shoulder orthogonal to the stem and configured for supporting the bottom surface of the arm with the flange contacting the top surface of the arm, with a portion of the arm sandwiched therebetween.

12. The twist-lock fixing of claim 11, wherein the head further comprises:
at least one ramp configured for guiding the arm onto the shoulder.

13. The twist-lock fixing of claim 1, wherein the connector is T-shaped and the locking channel is a T-slot locking channel.

14. The twist-lock fixing of claim 1, wherein the twist-lock fixing further comprises:
an object support configured for supporting a component.

15. The twist-lock fixing of claim 14, wherein the object support is a cradle mount defining a channel configured for receiving the component, the cradle mount comprising:
at least one receiver arm configured for retaining the component in the channel; and a stand-off member extending from the body section, the stand-off member configured for spacing the receiver arm apart from the body section to define the channel.

16. A twist-lock fixing configured for attaching to a workpiece at a locking channel defined in the workpiece, the twist-lock fixing comprising:

a connector configured for receipt into the locking channel, the connector comprising:

a stem having a first end opposite a second end, the stem comprising:

a first side surface;

a locking tab extending from the first side surface of the stem, the locking tab including a free end spaced apart from the stem;

a first stop configured for limiting a rotation of the connector in the locking channel in a first direction, the first stop extending from a second side surface of the stem, the second side surface of the stem opposite the first side surface of the stem; and a second stop configured for limiting a rotation of the twist-lock fixing in the locking channel in the first direction, the second stop extending from the first side surface of the stem, the second stop spaced apart from the locking tab; and a head, the head extending from the second end of the stem, the head spaced apart from the locking tab; and a body section, the body section attaching to the connector at the first end of the stem, the body section comprising:

a flange configured for contacting a first side of the workpiece to limit a longitudinal insertion of the connector into the locking channel, the flange including a lower side that faces the head, the lower side of the flange defining a recess configured to receive the free end of the locking tab, wherein as the twist-lock fixing is rotated from an unengaged position to a transitional position, the locking tab bends and the free end of the locking tab extends into the recess of the flange, wherein as the twist-lock fixing is further rotated from the transitional position to a locked position, the locking tab unbends and the free end of the locking tab unextends from the recess of the flange, and wherein in the locked position the locking tab is positioned to contact the locking channel to limit the rotation of the twist-lock fixing in the locking channel in a second direction that is opposite the first direction.

17. The twist-lock fixing of claim 16, wherein the connector and the body section are integrally formed through an injection-molding process.

18. A twist-lock fixing configured for attaching to a workpiece at a locking channel defined in the workpiece, the twist-lock fixing comprising:

a connector configured for receipt into the locking channel, the connector comprising:

a stem having a first end opposite a second end, the stem comprising:

a first side surface; and a locking tab extending from the first side surface of the stem, the locking tab including a free end spaced apart from the stem; and a head, the head extending from the second end of the stem, the head spaced apart from the locking tab;

a body section, the body section attaching to the connector at the first end of the stem, the body section comprising:

a flange configured for contacting a first side of the workpiece to limit a longitudinal insertion of the connector into the locking channel, the flange including a lower side that faces the head, the lower side of the flange defining a recess configured to receive the free end of the locking tab; and an object support configured for supporting a component, the object support being a cradle mount defining a channel configured for receiving the component, the object support comprising:

at least one receiver arm configured for retaining the component in the channel; and a stand-off member extending from the body section, the stand-off member configured for spacing the receiver arm apart from the body section to define the channel, wherein as the twist-lock fixing is rotated from an unengaged position to a transitional position, the locking tab bends and the free end of the locking tab extends into the recess of the flange, wherein as the twist-lock fixing is further rotated from the transitional position to a locked position, the locking tab unbends and the free end of the locking tab unextends from the recess of the flange, and wherein in the locked position the locking tab is positioned to contact the locking channel to limit the rotation of the twist-lock fixing in the locking channel in a second direction that is opposite the first direction.

19. The twist-lock fixing of claim 18, wherein the stem further comprises:

a first stop configured for limiting a rotation of the connector in the locking channel in a first direction, the first stop extending from a second side surface of the stem, the second side surface of the stem opposite the first side surface of the stem; and a second stop configured for limiting a rotation of the twist-lock fixing in the locking channel in the first direction, the second stop extending from the first side surface of the stem, the second stop spaced apart from the locking tab.

20. The twist-lock fixing of claim 1, wherein the twist-lock fixing includes a longitudinal axis defined between the first and second ends, and the locking tab extends from the first side surface of the stem in a direction orthogonal to the longitudinal axis.

\* \* \* \* \*